(12) United States Patent
Alsharaballi

(10) Patent No.: US 11,808,740 B2
(45) Date of Patent: Nov. 7, 2023

(54) SYSTEMS AND METHODS FOR MEASURING STRAIN USING REMOVABLE REUSABLE MARKERS

(71) Applicant: University of South Carolina, Columbia, SC (US)

(72) Inventor: Alaa Alsharaballi, Cayce, SC (US)

(73) Assignee: University of South Carolina, Columbia, SC (US)

( * ) Notice: Subject to any disclaimer, the term of this patent is extended or adjusted under 35 U.S.C. 154(b) by 683 days.

(21) Appl. No.: 16/805,926

(22) Filed: Mar. 2, 2020

(65) Prior Publication Data

US 2020/0278282 A1 Sep. 3, 2020

Related U.S. Application Data

(60) Provisional application No. 62/812,462, filed on Mar. 1, 2019.

(51) Int. Cl.
*G01N 3/08* (2006.01)
*G01N 3/06* (2006.01)
*G01N 3/02* (2006.01)

(52) U.S. Cl.
CPC ............... *G01N 3/08* (2013.01); *G01N 3/062* (2013.01); *G01N 3/068* (2013.01); *G01N 3/02* (2013.01); *G01N 2203/0003* (2013.01); *G01N 2203/0017* (2013.01); *G01N 2203/0035* (2013.01); *G01N 2203/0268* (2013.01); *G01N 2203/0605* (2013.01); *G01N 2203/0641* (2013.01); *G01N 2203/0647* (2013.01); *G01N 2203/0682* (2013.01)

(58) Field of Classification Search
CPC .......... G01N 3/08; G01N 3/062; G01N 3/068; G01N 3/02; G01N 2203/0003; G01N 2203/0017; G01N 2203/0035; G01N 2203/0605; G01N 2203/0641; G01N 2203/0268; G01N 2203/0647; G01N 2203/0682
See application file for complete search history.

(56) References Cited

U.S. PATENT DOCUMENTS

| | | | | |
|---|---|---|---|---|
| 4,690,001 A | * | 9/1987 | Harvey | G01D 5/34 348/294 |
| 5,568,259 A | * | 10/1996 | Kamegawa | G01B 11/16 356/625 |
| 6,094,259 A | * | 7/2000 | Kamegawa | G01B 11/16 73/800 |
| 2011/0271766 A1 | * | 11/2011 | Chilinski | G01N 3/062 73/826 |
| 2017/0219468 A1 | * | 8/2017 | Peterson | G01N 3/08 |
| 2020/0383685 A1 | * | 12/2020 | Sauter | A61B 17/1227 |

FOREIGN PATENT DOCUMENTS

| | | | | |
|---|---|---|---|---|
| AT | 505036 A4 | * | 10/2008 | ............... G01N 3/20 |
| DE | 102005019372 B3 | * | 10/2006 | ............... G01N 3/02 |
| KR | 20120110526 A | * | 10/2012 | ............... G10N 3/08 |
| WO | WO-2004073487 A2 | * | 9/2004 | ............. A61B 17/08 |

\* cited by examiner

*Primary Examiner* — Jonathan M Dunlap

(57) ABSTRACT

Novel markers that can be attached physically to a tensile specimen with a center guide to allow for measuring correct strain, as well as a binder that fixes and holds a pin guide to its location on the specimen during the test.

16 Claims, 33 Drawing Sheets

Manufacturing process:

| Property | Stick dot | |
|---|---|---|
| | Average | Scattering |
| Yield stress | 18.32 | 0.11 |
| Yield strain | 0.12 | 0.00 |
| Break stress | 37.61 | 1.32 |
| Break strain | 9.09 | 0.40 |
| | | |
| Onset | 4.94 | 0.34 |
| Gp (7-8) | 59.67 | 8.07 |
| | | |
| Stress at strain=6 | 19.25 | 1.63 |
| Stress at strain=6.5 | 21.62 | 2.02 |
| Stress at strain=7 | 24.28 | 2.42 |
| | | |

FIGURE 18A

| Property | Centered dot | |
|---|---|---|
| | Average | Scattering |
| Yield stress | 18.88 | 0.23 |
| Yield strain | ▓▓▓ | ▓▓▓ |
| Break stress | 33.49 | ▓▓▓ |
| Break strain | 8.09 | 0.68 |
| | | |
| Onset | 4.88 | 0.03 |
| Gp (7-8) | 67.62 | 0.78 |
| | | |
| Stress at strain=6 | 20.42 | 0.15 |
| Stress at strain=6.5 | 23.25 | 0.16 |
| Stress at strain=7 | 26.28 | 0.13 |
| | | |

FIGURE 18B

| Property | Paint marker dot | |
|---|---|---|
| | Average | Scattering |
| Yield stress | 19.54 | 0.37 |
| Yield strain | 0.11 | 0.01 |
| Break stress | 37.13 | 1.21 |
| Break strain | | |
| | | |
| Onset | 5.00 | 0.02 |
| Gp (7-8) | 67.79 | 0.63 |
| | | |
| Stress at strain=6 | 21.04 | 0.30 |
| Stress at strain=6.5 | 23.64 | 0.03 |
| Stress at strain=7 | 26.34 | 0.32 |
| | | |

FIGURE 18C

| Stick | Av | std | max-min diff/mean | Centered | | | | Paint | | | |
|---|---|---|---|---|---|---|---|---|---|---|---|
| yield stress (Mpa) | 18.3233 | 0.305967 | 0.035 | 18.67667 | 0.292451 | 0.44 | 0.0233 | 19.34 | 0.367296 | 0.73 | 0.0374 |
| yield strain (mm/m) | 0.1171 | 0.0003 | 0.005 | 0.11033 | 0.000907 | 0.0018 | 0.0082 | 0.105633 | 0.005754 | 0.0105 | 0.0494 |
| break stress (Mpa) | 37.60867 | 1.317355 | 2.96 | 32.49333 | 5.467928 | 9.72 | 0.2817 | 37.12867 | 1.21022 | 2.42 | 0.0661 |
| break strain (mm/m) | 9.093933 | 0.395264 | 0.79 | 8.093 | 0.663159 | 1.229 | 0.081 | | | | |
| onset | 4.943333 | 0.34.6667 | 0.88 | 4.89 | 0.034441 | 0.06 | 0.0133 | 4.996667 | 0.028817 | 0.04 | 0.0088 |
| Ga (7-8) Mpa | 59.67333 | 8.066476 | 13.51 | 67.62 | 0.788769 | 1.86 | 0.0091 | 67.79333 | 0.626326 | 1.25 | 0.0084 |
| stress at 6 (mm/mm) | 19.25 | 1.626735 | 3.15 | 20.42 | 0.509097 | 0.9 | 0.0247 | 21.04 | 0.304039 | 0.55 | 0.0085 |
| stress at 6.5 (mm/m) | 21.61867 | 2.03478 | 3.92 | 13.35 | 0.357162 | 0.29 | 0.0035 | 23.84 | 0.038641 | 0.06 | 0.0005 |
| stress at 7 (mm/mm) | 24.28333 | 2.422815 | 4.69 | 26.28 | 0.132288 | 0.25 | 0.0085 | 26.34333 | 0.317543 | 0.55 | 0.0026 |

FIGURE 18D

SYSTEMS AND METHODS FOR MEASURING STRAIN USING REMOVABLE REUSABLE MARKERS

BACKGROUND OF THE INVENTION

1) Field of the Invention

The present invention relates to novel markers that can be attached physically to a tensile specimen with a center guide to allow for measuring correct strain, as well as a binder that fixes and holds a pin guide to its location on the specimen during the test.

2) Description of Related Art

Polymeric materials are increasingly being used because manufacturers have modified their properties to suit many different applications. Typically, polymeric materials are tested using tensile machines to assure their mechanical properties are adequate for the application for which they are manufactured. Some tensile properties require measuring strain throughout the test such as yield strain, break strain, and strain hardening modulus.

Tensile test has been used to characterize mechanical properties of a variety of materials types. Many standards required to measure strain for different materials type such as metal and plastic. Measuring strain involved in many material types and forms such as metals, polymers, rubbers, biological tissues, foam materials, and textile materials.

Strain can be measured using a different type of extensometers. Extensometers are divided into two categories: contact and noncontact extensometers. Contact extensometers are mounted directly onto a tensile specimen via knife edges. Examples of contact extensometers are clip-on extensometer for a few millimeters displacement and long travel extensometer for high elongation measurement. Contact extensometer's sharp knife edge can cause notching to specimen surface which affects its mechanical properties especially for low stiffness materials such as polymers and biomedical materials. A noncontact extensometer is the other type of extensometer; an optical device measures strain between specific targets on the specimen without direct contact. Noncontact extensometers allow for measuring the strain of highly extensible materials up to their breaking point accurately.

A video extensometer is an example of noncontact type extensometer. They require attaching measurement marks to the specimen, such as stick dot or paint marker dot, that are in contrast to the specimen color. The location of these marks is evaluated by a software algorithm and during the test, mark movement is converted to extension values. Researchers who used this technique with the aid of optical device have reported many problems with its results. This is mainly due to paint markers or stick dots shape deformation. Paint marker with specific dimensions is located on a tensile specimen for easy detection by the video extensometer. Highly ductile materials such as high-density polyethylene HDPE exhibit very high strain that result in appreciable change of dot mark size and color fading. This low color contrast highly impacts extensometer reading accuracy. Another source of error is the sample elongation becoming very narrow in a direction perpendicular to extension. This leads to a loss of significant part of the stress strain curve with strain measurement undetected prior to reaching break point. For this reason, for highly extensible materials, the self-adhesive marker method is preferred to maintain a sufficient color contrast with fixed dimension.

The elongation of the material is a physical deformation of the sample and is a type of strain associated with tensile measurements. Along these lines, extensometers are one part of a variety of tensile tests including the determination of yield strength, tensile strength, yield point elongation, strain-hardening exponent and strain ratio. There are two classes of extensometers, which vary in the method the measurement is performed. Contact extensometers test the deformation by directly placing a physical object onto the sample such as a knife-edge. Non-contact extensometers use cameras and light to determine the deformational parameters without physically touching the sample.

Polymeric materials are produced in different properties, magnitudes and types, such as strength, stiffness, and ductility, depending on their application. For example, high density polyethylene (HDPE), which is used as a resin in producing pipes and geomembrane liners, has a moderate strength and very high ductility. Other soft polymers may be produced in thin thickness for surgical applications. Due to the fragile nature of some polymeric materials, a non-contact video extensometer is the ideal solution for measuring tensile strain or elongation.

When using a video extensometer, a specimen is marked with two markers that contrast with the base material to allow them to be recognized by video extensometer. Video extensometers are supposed to provide strain measurements during tensile test up to and including the break point. It is important that the markers sharply contrast with the specimen to ensure correct target recognition and tracking. For instance, the mark could be a self-adhesive marker or a paint marker.

Self-adhesive markers can be attached to the test specimen at a required gage length and tracked by a video extensometer throughout the test. However, many limitations and errors may affect the strain measurements obtained when using these markers. Self-adhesive markers are made of non-extensible materials and may at some point during the test, lose contact at one side of the sample and remain attached to the other side. This results in a significant error in strain measurement for high ductile materials such as polyethylene materials which result in errors in the measured break strain. In addition, some tests such as a tensile test for strain hardening modulus is performed while the specimen is inside an oven chamber for the entire test time. This test requires measuring strain up to 12% value. Many researchers have pointed out falling and or breaking of self-adhesive markers when used at high temperature conditions, which results in losing significant data of strain below 12% that is necessary for strain hardening test.

Another option currently employed in research is to apply markers using a paint marker. These markers are applied to the specimen using, for example, a paint marker pen. In use, a Staedtler ruler may be used to make a marker shape such as circle, square, or lines at specific sizes. Marker color should be in contrast with specimen color, such as a white marker for a black specimen. Video extensometers track markers during tensile test and measure the distance between the centers of two markers. However, there are at least two limitations for this marker type. First, the paint marker effects the strength of the material, especially soft thin sheets. Second, for highly extensible materials, the marker fades and the extensometers lose or fail to track the markers because of low contrast between the markers and specimen. Thus, an error message appears in the software of the tensile machine and strain stops at some point because of fading and low contrast.

Specimen shape also limits the use of one or more of the above methods. For example, paint markers cannot be applied to wire specimens or thin rods because applied markers will be too small for the video extensometer to detect. Rough specimen surfaces on the other hand result in pointy paint marker edges which are not favored for measuring strain using video extensometers because a smooth marking edge is better detected. Also, self-adhesive markers cannot stick well on a rough specimen surface.

Several researchers have studied the effect of different types of paint markers and physically attached markers on the mechanical response of biomedical materials and biological tissues. It was found that markers can modify mechanical response and induce local stiffening of a specimen. Cyanoacrylate, for example, as a marker adhesive affects local and overall mechanical response of elastomer 300 SIL 50-BL and synthetic mesh. Further, caution is recommended with the use of cyanoacrylate for attaching markers on biomedical materials.

The physical properties of a sample can also limit the use of paint and stick dot markers. Sample surface texture—such as the non-uniform surface of synthetic meshes—affects the dot type selection and accuracy of measured strain. Current markers types are not suitable for rough surface of high-density polyethylene textured geomembrane. A sample's dimensions and shape dictate the selection of dot type. For example, thin wire specimens do not provide enough visible area for video extensometers measurements.

In addition to the physical properties, testing conditions such as high temperature can adversely impact test results. It is reported that some tensile tests that are performed at high temperature resulted in breakage of stick dot gage marker which led to discontinuity of tensile test curve and hardening modulus. In addition, stick dot may results in strain error measurement because it does not necessarily represent a specific point on a specimen, it rather slides randomly during tensile test especially with high extensible materials.

Therefore, a need exists in the field of tensile testing to create an alternative method to apply markers to specimens capable of correctly measuring strain until break point, surviving at high temperatures, and not effecting material strength and other tensile properties. There is also a need for a technique of applying markers to irregular specimen shapes and surfaces such as wires and ropes, and low strength materials. Finally, there is also need for a marker placement device to assure locating markers at a required gage length and to ensure that markers are located at the same distance from the center of a specimen. Accordingly, it is an object of the present invention to provide markers of the current disclosure to address the above issues.

SUMMARY OF THE INVENTION

In a first embodiment, the current disclosure may provide a system for measuring strain. The system may include a tensile specimen marker for use on a tensile specimen, which may include a first arm, a second arm, and a spring connecting the first arm to the second arm. The first arm may removably attach to a first side of a tensile specimen. The second arm may removably attach to a second side of the tensile specimen. The first arm may comprise a marker configured to define a position on the tensile specimen. Further, the tensile specimen marker may comprise at least one of: a dot, a cone, or a flat sheet. Yet still, the first arm may be configured to place the marker on the first side of the tensile specimen. Again, the second arm may comprise an attachment feature configured to attach to and grip the second side of the tensile specimen. Further yet, the attachment feature may comprise a spiral, a pin extending from the second arm, or a flat gripping surface. Yet again, the spring may be configured to move the first and second arms from a closed configuration to an open configuration. In the closed configuration the first and second arms may press against the tensile specimen. In the open configuration, the first and second arms may not engage the tensile specimen. Again yet, the tensile specimen marker may be flexible or rigid. Again further, the first arm, second arm, and the spring ma comprise a unitary body. Further still, the first arm, the second arm, and the spring may comprise multiple connected parts. Still yet, at least two tensile specimen markers may be included. Further, a tensile specimen may be defined. Still again, the tensile specimen may be a wire, a dog-bone, a rectangle or any flat form. Still yet, the at least two tensile markers may be configured to be attached, removed, and reused.

In a further embodiment, a method is provided for measuring strain. The method may include providing a tensile specimen, applying at least two of removable markers to the tensile specimen, and measuring strain between the removable markers. Further, step of measuring strain may comprise using a video extensometer to detect a location of each of the at least two removable markers. Still again, the least two of removable markers may be configured to attach to specimens comprising different materials. Further again, a location of the at least two of removable markers may be detected by a video extensometer, a laser extensometer, or a DIC system. Further still, the at least two removable markers may be attached to the tensile specimen using a ruler to specify a distance between the at least two removable markers on the tensile specimen. Further yet, the ruler may hold more than the at least two removable markers to provide for placing more than two markers at more than two locations on the tensile specimen to allow for measuring transverse strain in addition to vertical strain.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIGS. 18A, 18B, 18C, and 18D show Tables 1-4, respectively.

In a further embodiment, a "blade dot" configuration is provided for analyzing/measuring wire specimens. A center dot cannot be used for low surface section area specimens such as wire. Thus, a different type of dot must be designed and used for such specimens. The design includes a blade 1000 that sets on wire perpendicularly to represent a point on the specimen. The blade 1000 should be sharp enough to avoid sliding during the test. The force applied by the dot skeleton 1002 to grip the specimen and sharpness of blade should be evaluated to avoid any effect on strength of the material and premature break or effect on measured strain. The blade is inserted/attached to a u-shape 1100 of the skeleton. The blade may be inserted inside a circle dot 1200 and attached to the u-shape 1100 using super glue. The lower part of skeleton 1002 has a round shape 1300. Circle cloth, not shown, may attach to the round shape 1300 to allow free sliding on a specimen surface during the test while the blade is fixed at a point on the specimen on the front side of the specimen. The dot that is used for the wire specimen is called a "blade dot". Care should be taken by lab agent to avoid any injury because of possible breaking and jumping of the dot due to the blade/sample extruding sharp parts after specimen breakage. FIG. 20A shows a side view of blade dot 1000. FIG. 20B shows a top view of blade dot 1000. FIG. 20C shows a back view of blade dot 1000.

Figure 1A:
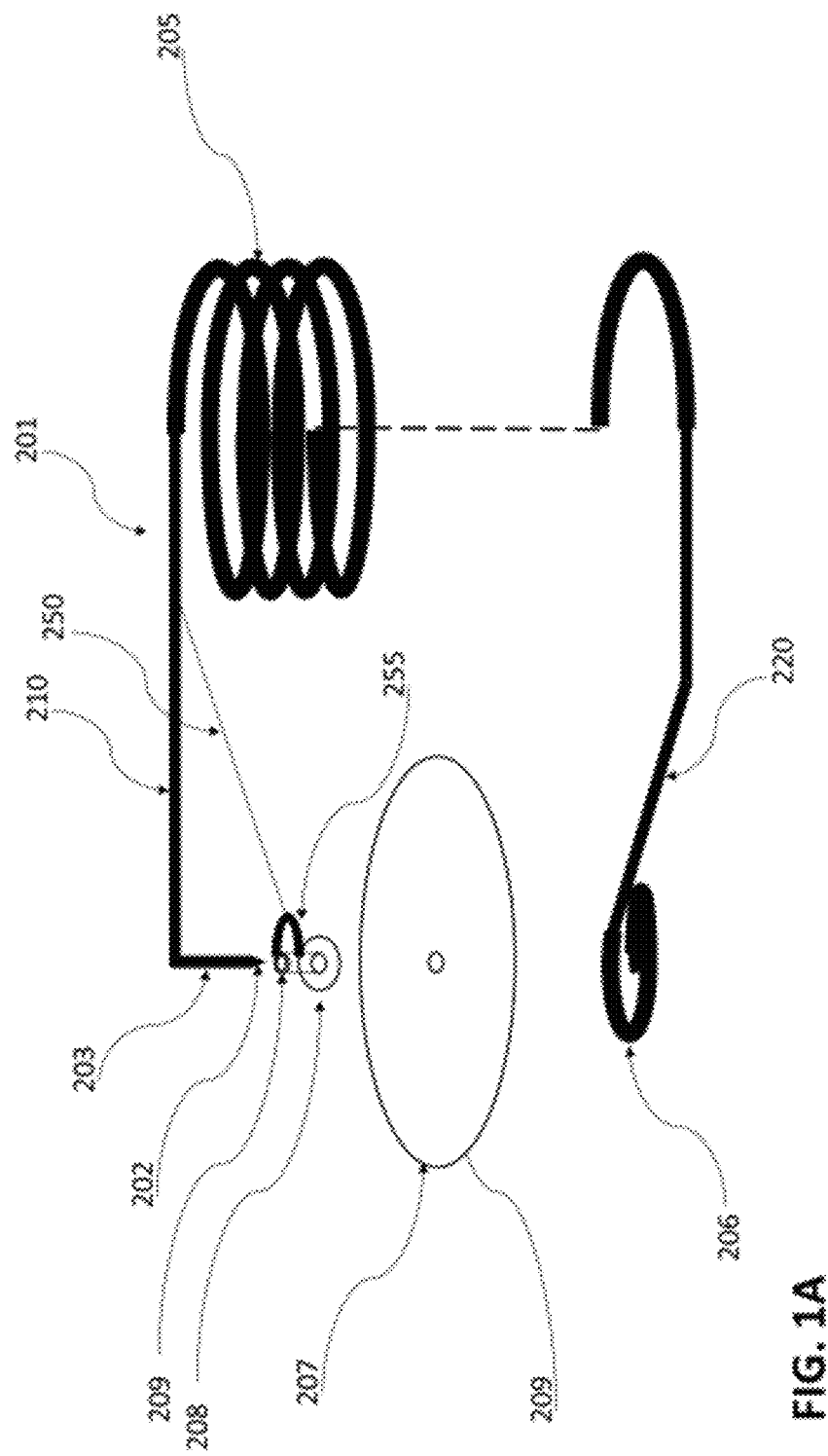
FIGS. 1A-1D shows an exploded perspective view of one example of a rigid marker type of the present invention.
Figure 1B:
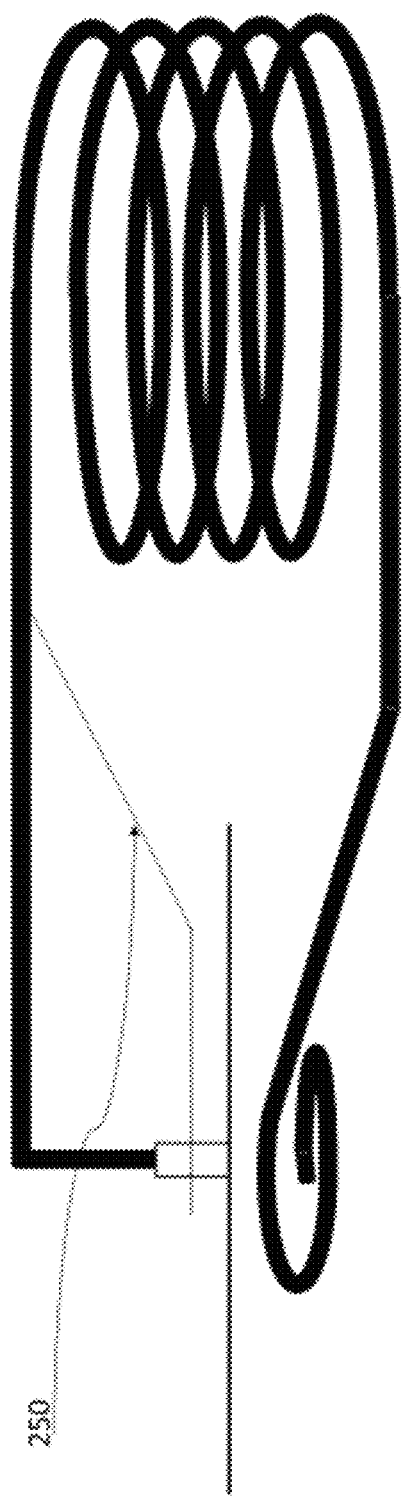
Figure 1C:
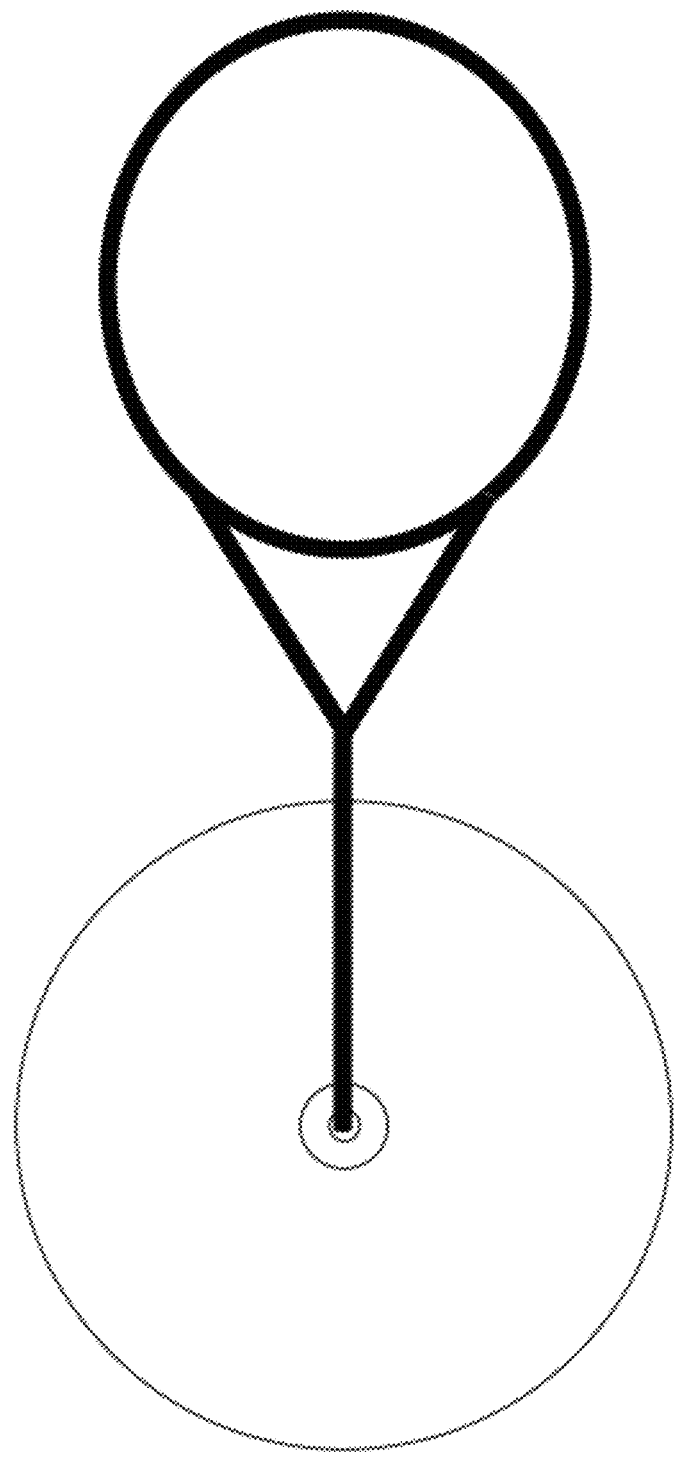
Figure 1D:
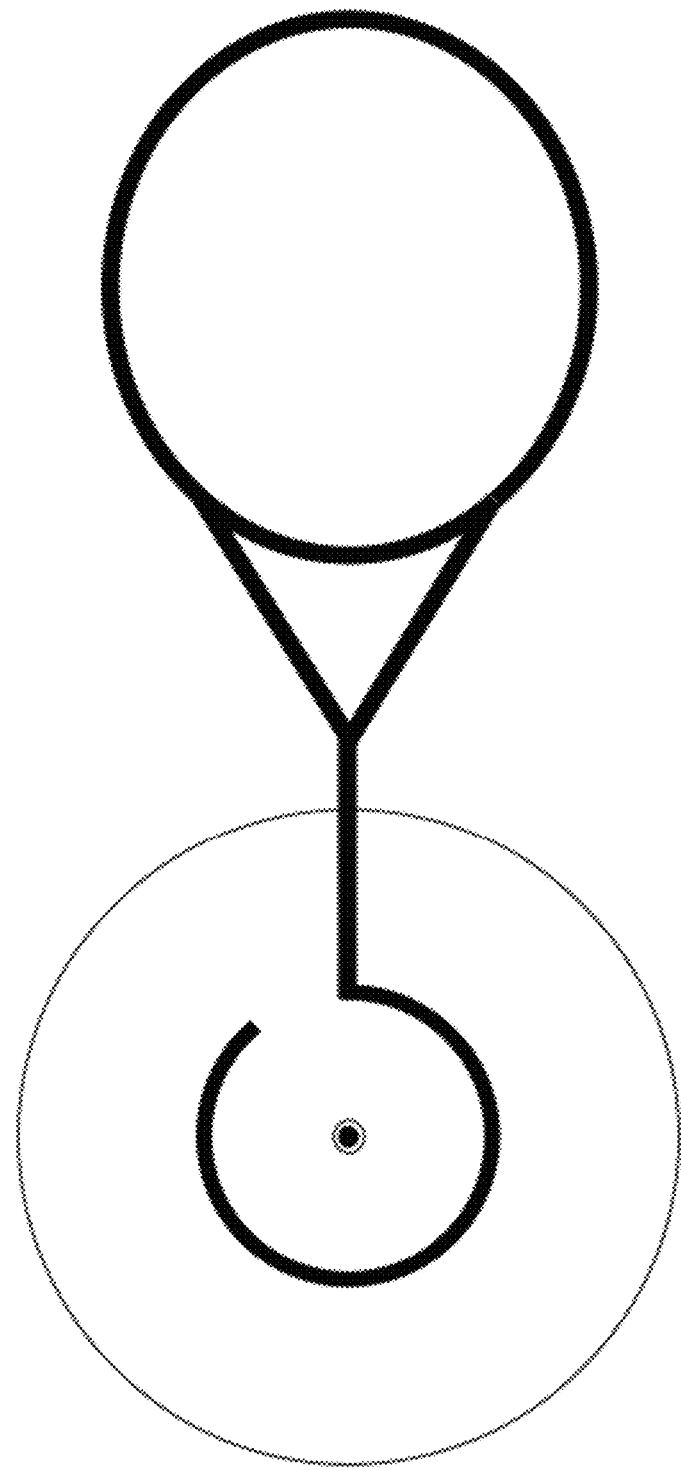

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The present disclosure provides novel markers that can be attached physically to a tensile specimen with a center guide to allow measuring correct strain and a binder that fixes and holds a guide, such as a pin, to its location on the specimen during the test. Further, the current disclosure provides a novel design for a marker that can be attached to a tensile specimen and allows measuring strain accurately and continuously until the end of a test as the marker remains located and visible within an optical extensometer field of view. The design overcomes the shortcomings of conventional self-stick and paint markers. The marker of the current disclosure comprises a skeleton made of a suitable material comprising elastic properties that allow the guide to attach to a material surface. The marker itself could be rigid or elastic depending on ease of manufacturing and cost. In addition, the current disclosure provides a design for a tool to apply this markers to specimens in the required gage length accurately and safely without damaging the marker itself.

The present disclosure will be described below by referring to the attached figures. In one aspect, a "centered maker" is provided. FIG. 1A depicts an exploded perspective view of the elements that may comprise a centered maker. Each centered marker has a ring fastener 201 that will hold a component of a marker and will apply a gentle pressure on the specimen. This pressure will allow a continuous attachment of a marker to the specimen during the test. Ring fastener 201 could be made of steel, plastic, synthetics, or any metal or material that has an elastic property that allows for the manufacturing of this product. Coil 205 may be designed to apply the force that will hold marker attachment continuously to the specimen throughout the tensile test. Coil 205 could be built as a helical or a straight line shape depending on the amount of pressure needed, specimen properties, and the inherent properties of the materials forming ring fastener 201.

First arm 210 and second arm 220 send gripping force from the coil 205 to the component of the marker skeleton that will be attached to the specimen. The length of both first arm 210 and second arm 220 should be selected at a design stage based on specimen width or a specimen narrow section width to allow for the center of the marker to be located at the center line of the specimen. First arm 210 extends and forms marker holder arm 203 that may comprise an angle, such as right, obtuse or acute, or form a curve. Marker holder 208 is comprised of a cylinder and a disk with a diameter which allows the cylinder to slide onto marker holder arm 203. The disc of marker holder 208 is attached to disc marker 207 using an adhesive, for purpose of example only and not intended to be limiting, a high strength glue. The outer edge of disc marker 207 should sit on the specimen and the disc should be as thin as possible so as not to occlude the specimen surface when tracked by video extensometer.

In FIG. 1, the disc marker 207 is made in a flat disk shape and attached to the flat disk of marker holder 208 and both are able to slide freely at the marker holder arm 203. The marker holder arm 203 ends with a sharp pin 202 that will sit on the specimen surface and continue to sit throughout the tensile test under forces that come from ring fastener 201. While sharp pin 202 sits on the specimen surface, a flat ring 250 is attached from one end to first arm 210 and ends with fork shape end 255 that slides on the disk of the marker holder to put a force enough to let the disk marker sit on the specimen surface during the tensile test. Second arm 220 ends with a flat round base 206 with ends pointed outward from the specimen surface to allow sliding on a specimen surface. The functionality of sharp pin 202 to sit and stick to a point on the specimen surface may be tested by the manufacturer by moving the flat round base 206 on specimen surface up and down a few millimeters and notice the stability of the sharp pin 202. If sharp pin 202 does not move, then the design is adequate for the specimens dimension and material properties. FIG. 1B is a side view of rigid marker. FIG. 1C is a top view while FIG. 1D is a bottom view.

Figure 2:
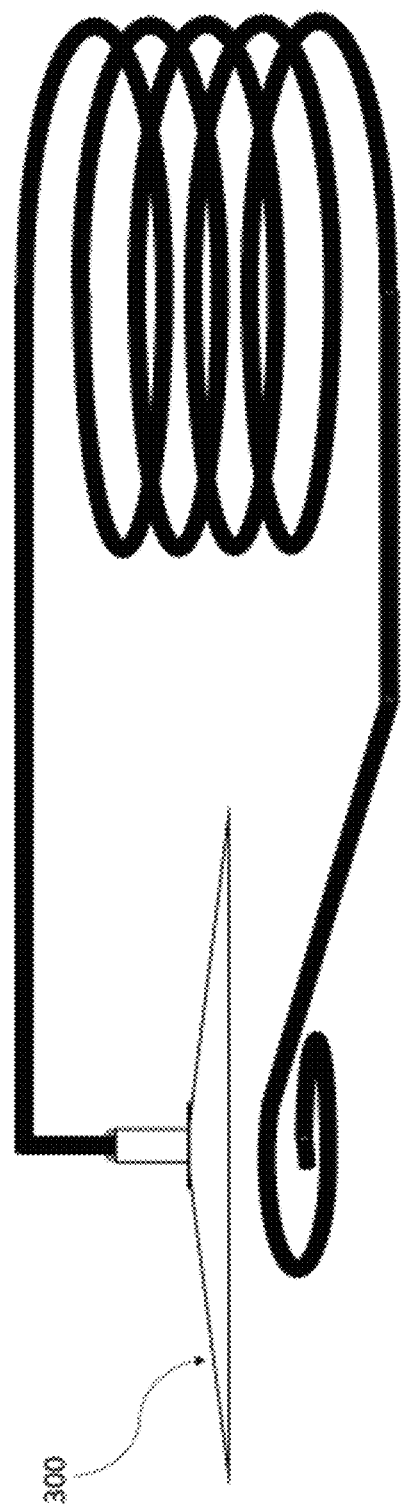
FIG. 2 illustrates a perspective view of a flexible marker type.

FIG. 2 shows another configuration of the centered marker with flexible marker form. Disc marker 300 is made of flexible material and attached to marker holder 208. The marker holder itself fixed or glued to marker holder arm 203 in a position that when sharp pin 202 touches a specimen, all the surrounding edges of marker 300 touch the specimen surface. The decision of whether to incorporate flexible or rigid marker design is based on marker production ease and cost.

Figure 3A:
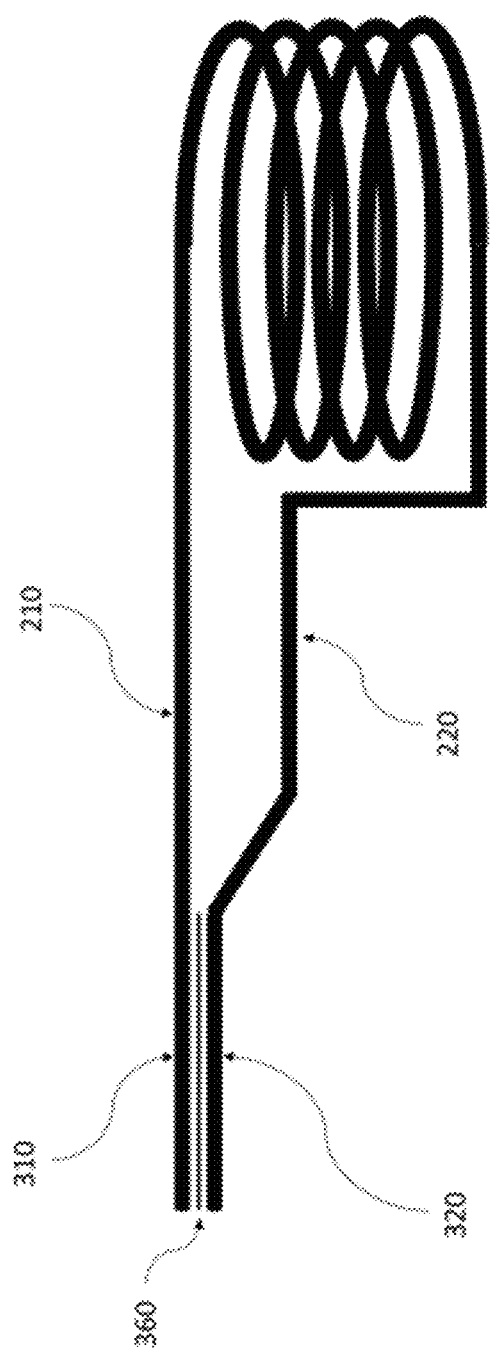
FIG. 3A shows a view of a marker designed especially for material with wire or rope specimen shape.
Figure 3B:
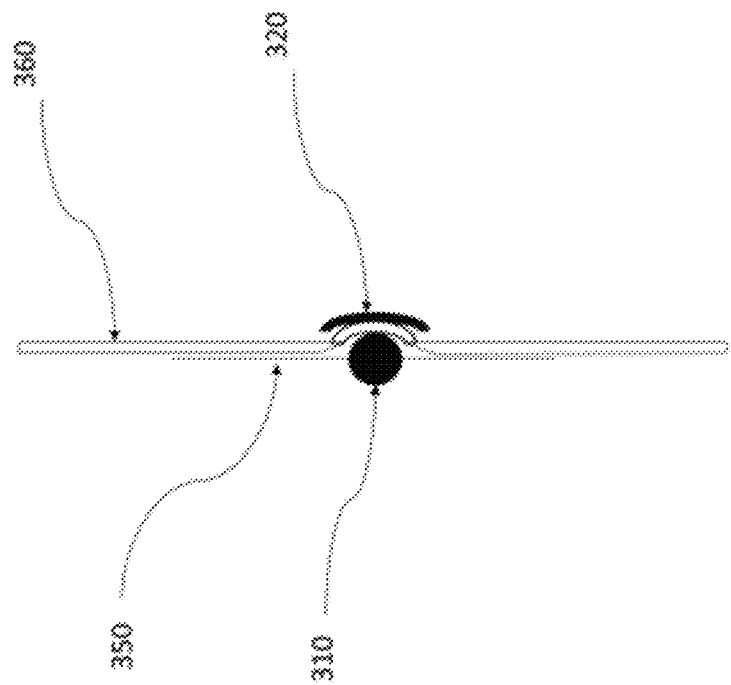
FIG. 3B shows a side view of 3A.

For wire and thin width specimen, an alternative engagement design is shown in FIG. 3A. FIG. 3A shows the design of a centered marker for rope and wire section materials. FIG. 3B shows a section in marker with wire specimen 360 in place. First arm 210 extends to marker first holder arm 310 to hold flexible marker 350. Flexible marker 350 may cover the outside of the marker holder 310 or may be attached in two parts to the middle of marker holder 310. The inside of marker holder 310 presses on the wire/rope/thin width specimen. Flexible marker 350 touches the specimen during the tensile test. Second arm 220 extends to specimen holder arm 320 which has a helical cross section shape at the area that touches the specimen 360 so that the specimen is grabbed by both sides. Specimen 360 is sandwiched between marker holder arm 310 and specimen holder arm 320 so that no overturning or sliding occurs. The diameter of marker holder arm 310 and shape of back specimen holder arm 320 should be designed to meet wire cross sectional area and elastic and strength properties.

Figure 4:
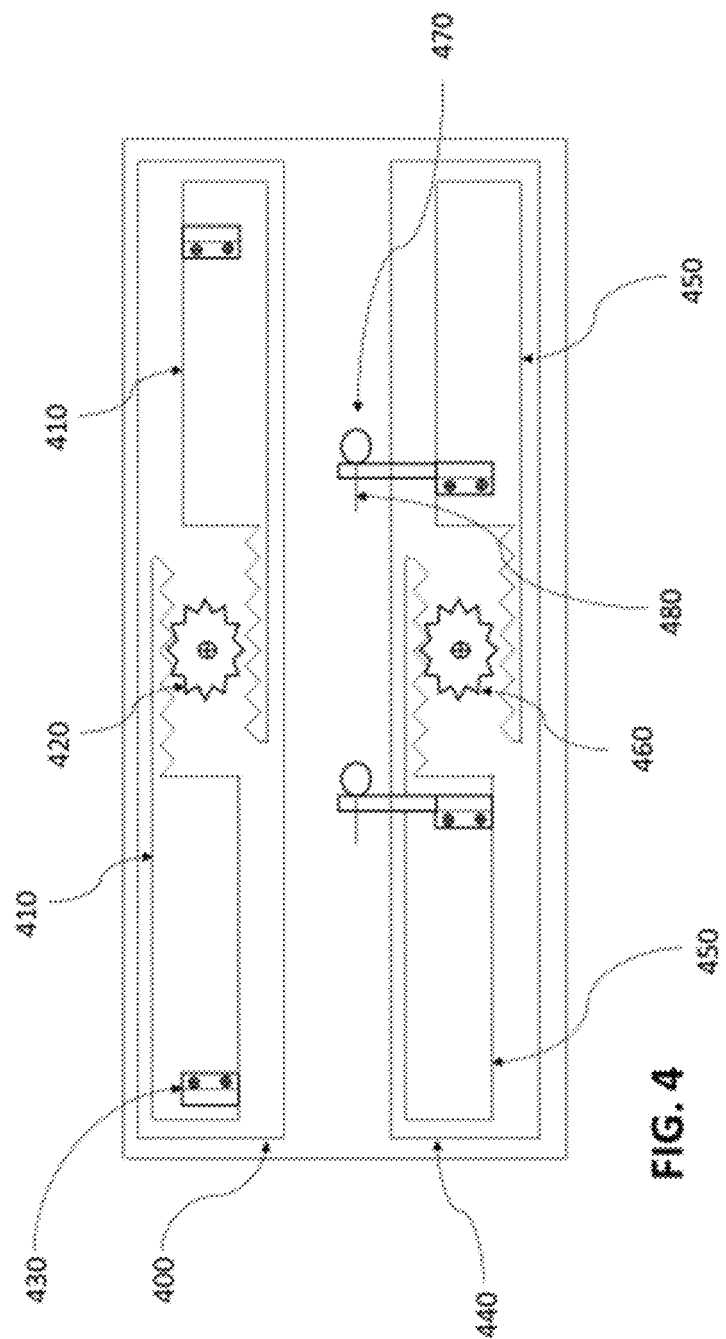
FIG. 4 shows a ruler clamp tool that is used to attach/apply marker to various specimen types.
Figure 5:
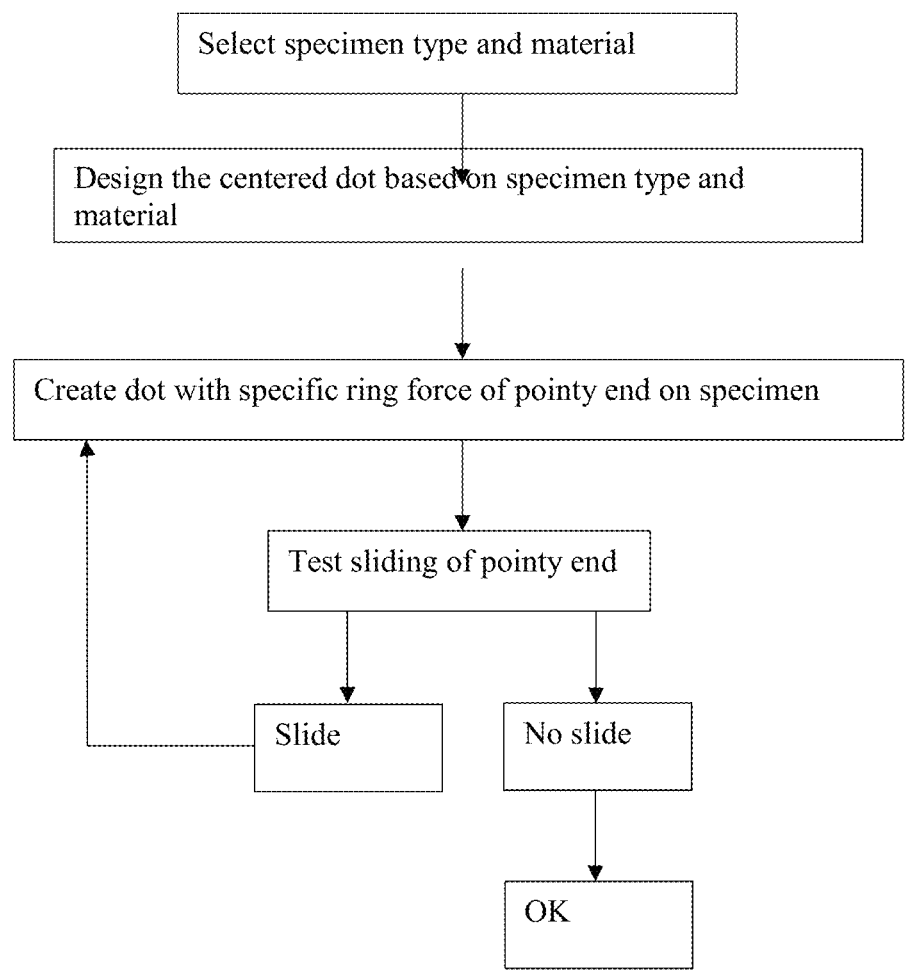
FIG. 5 illustrates a flow diagram illustrating the disclosed methods of producing a centered dot.

FIG. 4 depicts tools used to attach different types of centered markers above to their relevant specimens. Specimen ruler 400 use to center the specimen. It consists of two opposite toothed rulers 410 that move in opposite directions over a similar distance by interlocking with toothed wheel 420. A specimen should set between two holders 430. Marker launcher 440 launches markers to the specimen. It consists of two opposite marker toothed roller 450 that move in opposite direction in similar distance by interlocking with toothed wheel 460. The center of tooth wheel 460 located at same horizontal location of tooth wheel 420 of the specimen ruler. Squeezer 470 attached to marker toothed roller 450. The squeezer 470 has pointy ends 480 to enlarge the distance between first arm 210 and second arm 220 and keep it open, insert the specimen, and leave the marker attached to the specimen manually. A caliper (digital or dial gage caliper) may be added to marker launcher 440 to locate centered markers at required locations on the specimen to result in exact gage length. FIG. 5 shows a manufacturing process for markers of the current disclosure.

The current disclosure provides, at least, the following advantages over existing systems: (1) attaching a marker to a tensile specimen to allow accurate measured strain using any optical measurement device such as DIC, video extensometer, and laser extensometer; (2) obtaining strain or deformation of wire soft materials with high accuracy; (3) attaching markers wherein the center between the markers represents a point on the specimen that continuously remains the center during the test; (4) flexibility to locate markers on a specimen with any gage length at high accuracy using a caliper; and (5) using a marker to allow to attach a specimen with rough, irregular, or non-smooth surfaces such as a geomembrane or geotextile having a textured, non-smooth surface.

Experimental Results

Materials and Methods. Material. A commercial High-density polyethylene geomembrane was selected for this investigation. The material is smooth, 1 mm thickness with an anonymous source. It is stored in the dark in good condition at room temperature. The initial mechanical and physical properties are unknown.

Sample Preparation.

Dog bone samples type IV were cut according to ASTM D638 for tensile testing. All samples cut in a direction cross to machine direction which represents the weak mechanical strength direction. The sample is 115 mm total length and the narrow section is 6 mm width. The length of the narrow section is about 33 mm allow locating dot with a gage length of 25 mm.

Tensile Machine.

Figure 6:
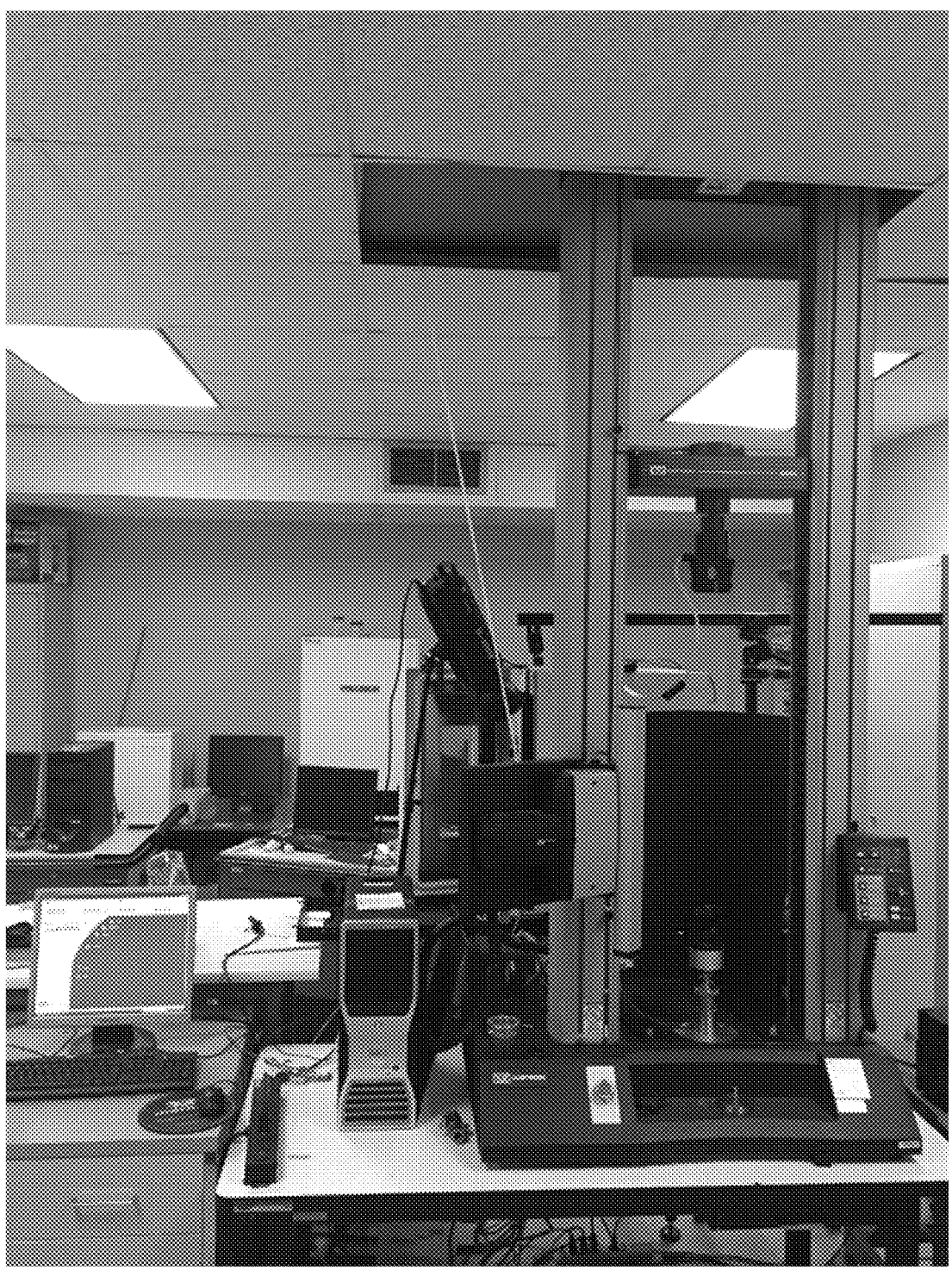
FIG. 6 shows an Instron 5566 tensile machine.

Tensile testing was performed using a dual column Instron 5566 with a load cell of 5 kN, see FIG. 6. Strain was measured using a video extensometer with the field of view of 350 mm. The test performed at a displacement rate of 10 mm/min and with a sampling frequency of 0.5 seconds to allow capturing the elastic region of the stress-strain curve before the yield point.

Data Analysis.

Four tensile properties were measured in the investigation: yield stress, yield strain, break stress, and break strain except at the paint marker in which break strain was not measured for a limitation because of this dot. Stress at a specific strain value (5, 5.5, and 6 mm/mm) were measured to compare strain hardening region data. Three replicate tests were performed; average values are reported for each dot type. The strain hardening modulus is measured according to previous research as a slope of true stress-true strain curve at true strain range of 7-8 mm/mm.

DOT Type.

Figure 7A:
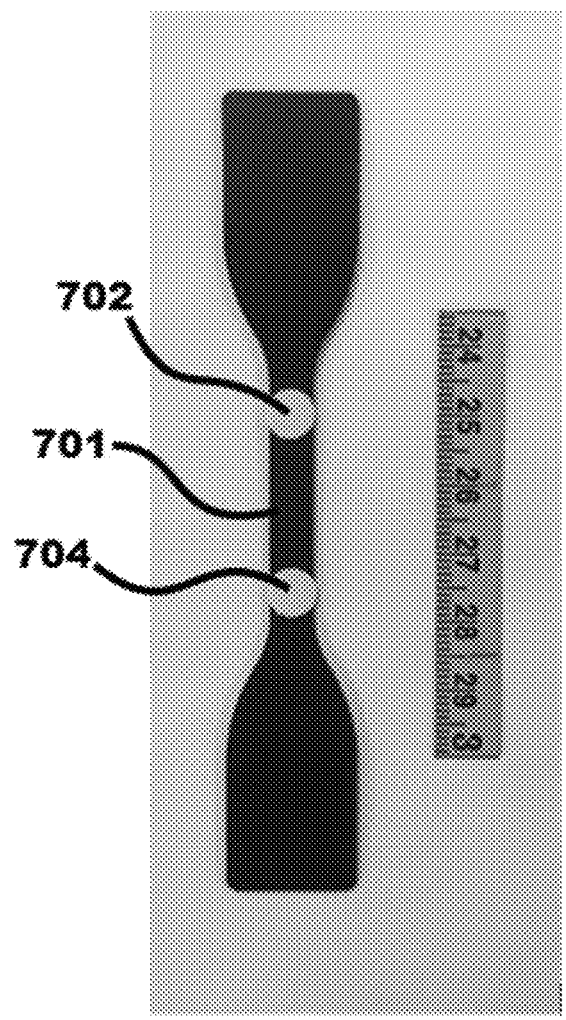
FIG. 7A shows an experimental set-up of the present disclosure using two separate dots as markers.

Three types of dots were used: Stick dot, paint marker dot, and a newly designed dot of the current disclosure. The stick dot was prepared by cutting 7 mm diameter stick paper using a paper punch. Two stick dots 702 and 704 were applied to a specimen 701 with gentle thumb pressure to assure good contact. A 25 mm distance between dots is used as a gage length, see FIG. 7A.

Figure 7B:
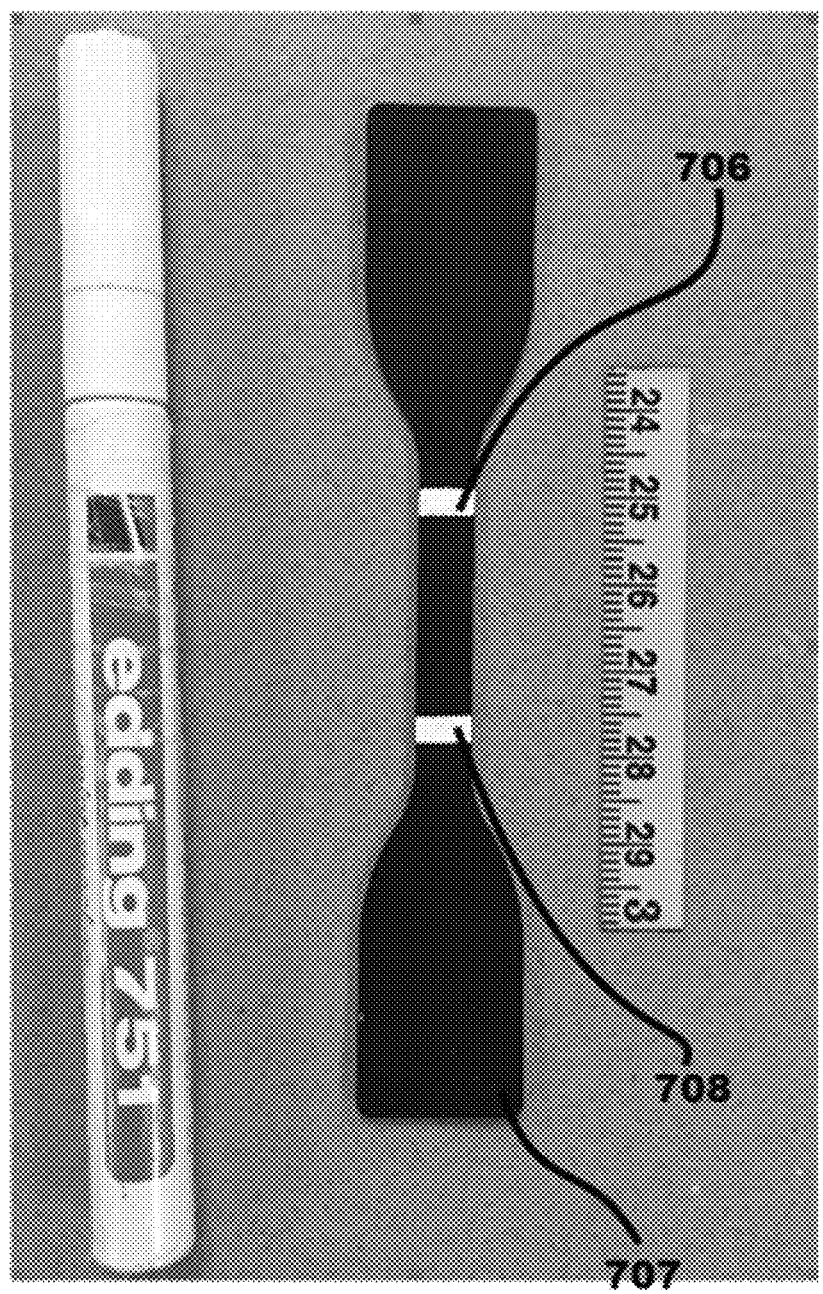
FIG. 7B shows an experimental set-up of the present disclosure using two separate paint markers.

FIG. 7B shows a paint marker used to mark spots 706 and 708 located on the specimen 707 with specific dimensions specified in the video extensometer user manual—Instron Video Extensometer AVE and SVE Reference Manual— equipment M26-14185-EN Revision K (Manual). Care was been taken to apply paint marker with the same shape and with specific dimensions. A tape has been punched from two sides with rectangle holes using coil punch, stuck on a specimen and dot applied using a white paint marker Edding 751 that is recommend for black materials. The tape was then removed to lift two rectangular dots with a height of 3 mm and cover the total specimen width with a gage distance of 25 mm center to center, see FIG. 7B.

Figure 8:
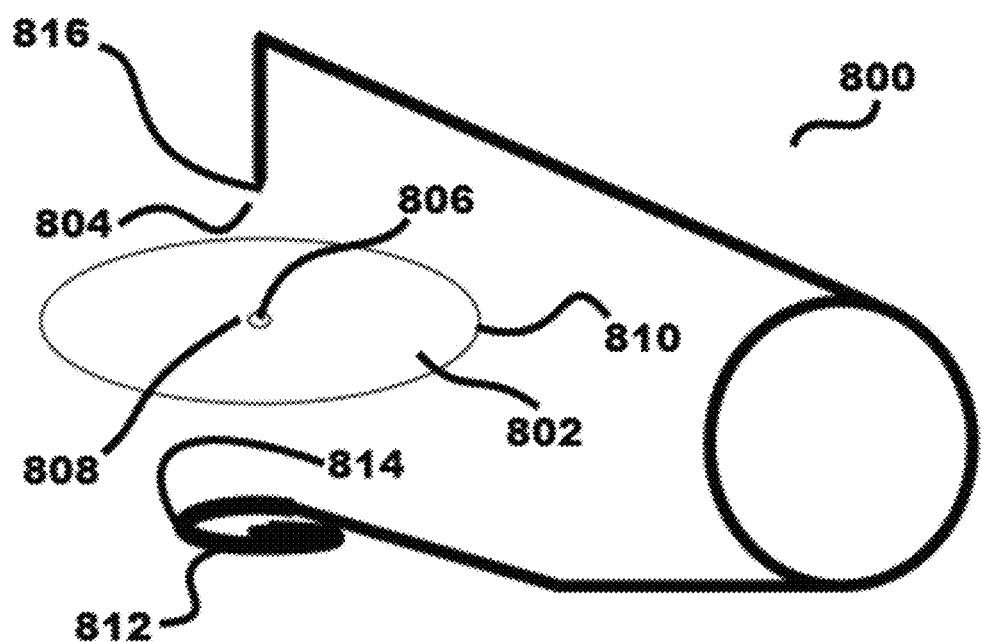
FIG. 8 shows a sketch diagram of the new dot design of the current disclosure.
Figure 9:
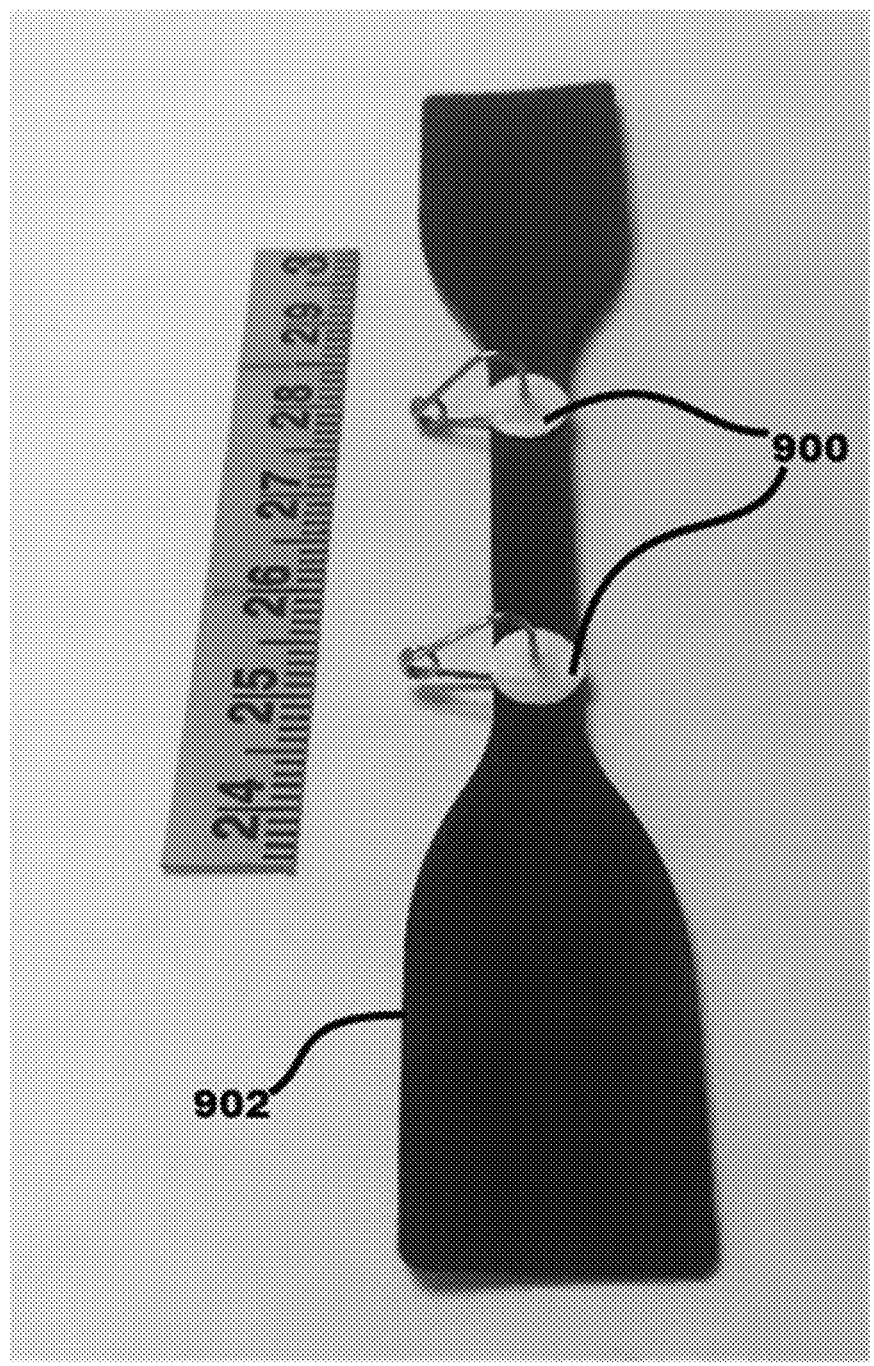
FIG. 9 shows two prototype centered dots located on dog bone shaped geomembrane sample.

Current Disclosure Design Dot:

FIG. 8 shows a sketch diagram of the new dot design 800. The designed dot is a compromise of a white solid plastic disc 802 with a thickness of 0.3 mm and a steel pin 804 with a pointy end that penetrate the disc in middle orifice 806 defined within the center 808 of plastic disc 802. Center 808 of disc 802 was located visually using a regular 1 mm space ruler. The measured strain requires a correction when the sample thickness exceeds 1 mm from the calibrated surface. Thus, the penetration of pin 804 is barely set on the specimen, not shown, at a point so that disc 802 is on specimen surface with no observable gap between sample and disc edge 810. Opposite pin 804 is a spiral base 812 that has round end 814 that lays parallel to the specimen surface. The benefit of round end 814 is first to allow sliding on the specimen while pin 804 sits on the opposing side and maintains vertical alignment of pointed end 816 of pin 804 to the specimen surface. This design allows a video extensometer to locate the disc that sticks continuously to a point on the specimen surface, thus this dot is named the "centered dot." FIG. 9 shows two prototype centered dots 900 located on dog bone geomembrane sample 902.

Results.

Figure 10:
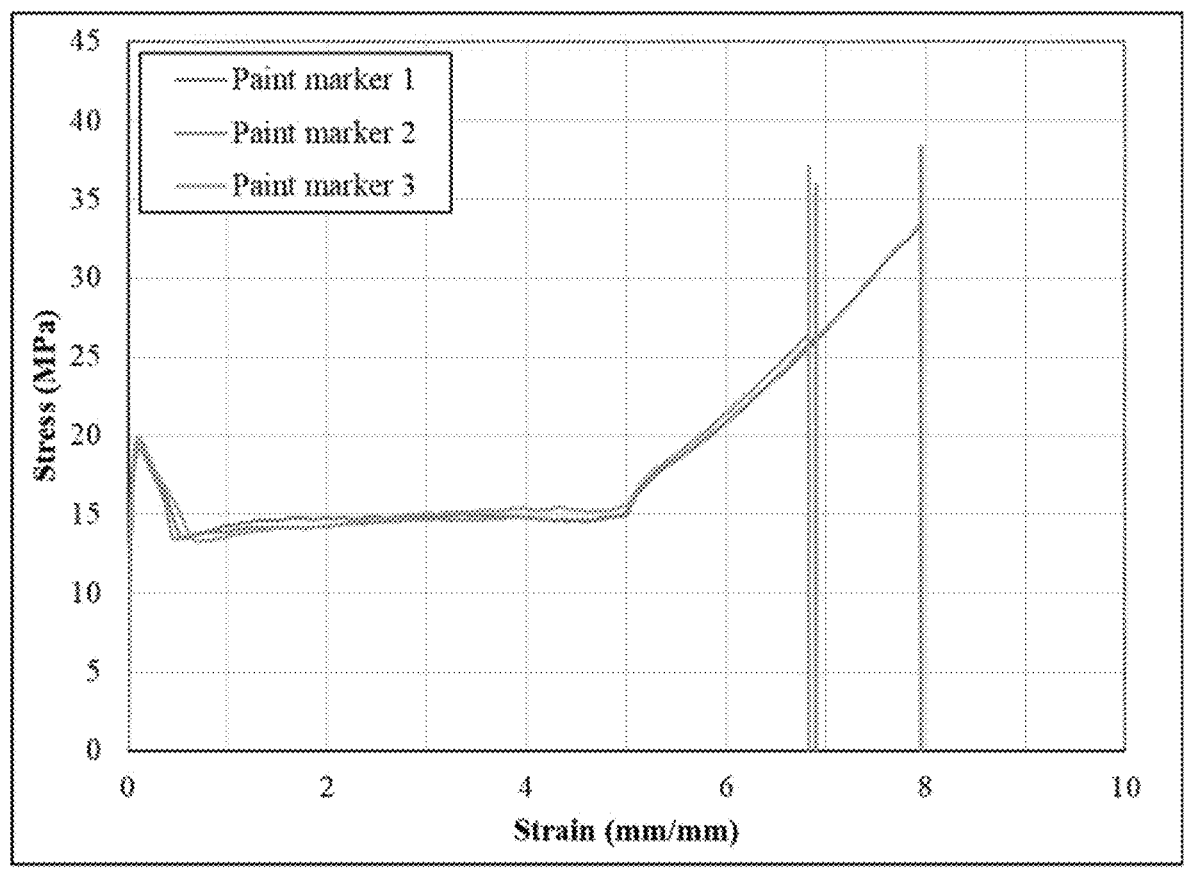
FIG. 10 shows stress-strain curves of the three replicates using paint marker dots.

Tensile tests were performed using the three different dot types as described supra with three replicates for each type. FIG. 10 shows three replicates of the tensile test using paint marker dots. Paint markers deform as the specimen is exposed to an extension, and the video extensometer locates the center of each dot from its deformed height. The three replicates curves are coincided up to the onset of strain hardening at a strain of about 5 mm/mm. After onset, two curves coincide while the third curve has a little steeper slope. Because of the high extensibility of HDPE geomembrane, paint marker dots fade at high strain and the video extensometer loses dot tracking for two test curves at a strain of about 7 mm/mm and the third test curve at 8 mm/mm. This problem results in losing significant tensile test data and prevents measuring properties such as break strain.

Figure 11:
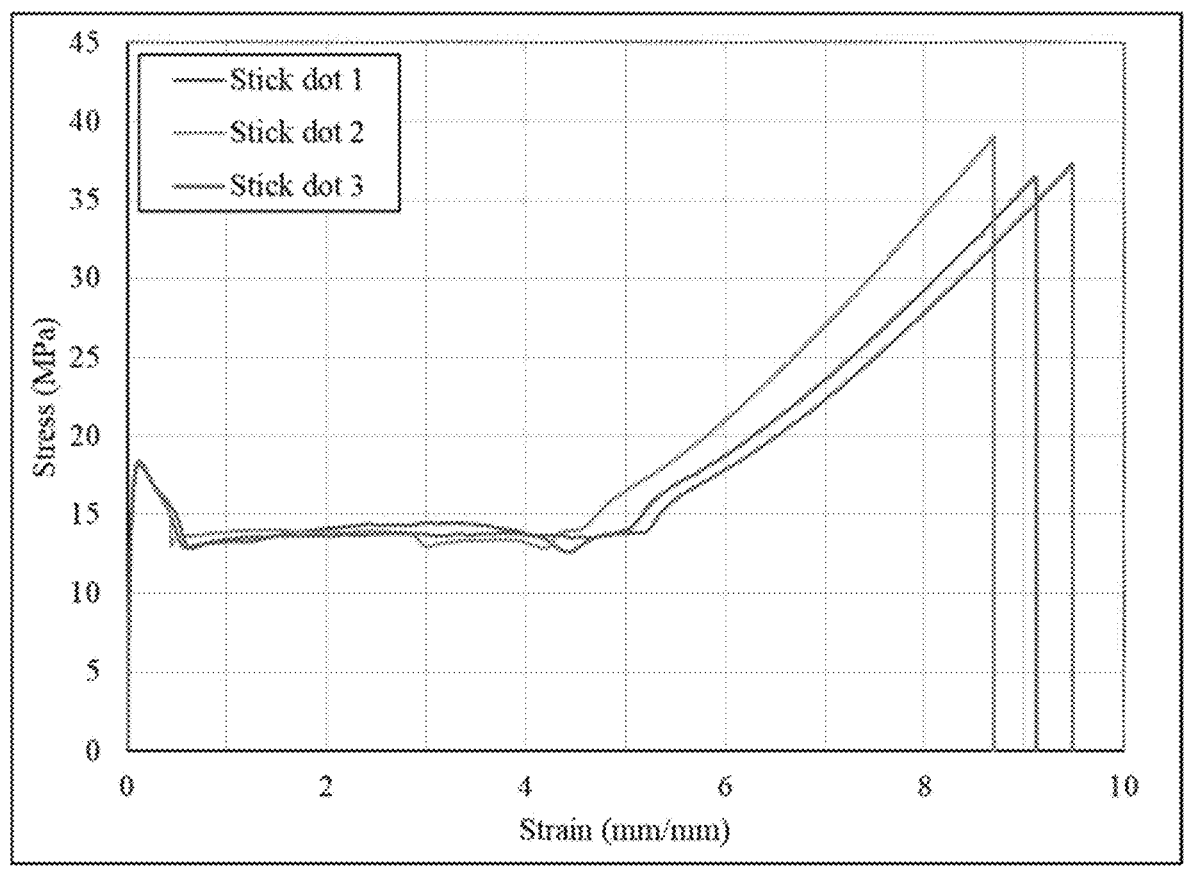
FIG. 11 shows stress-strain curves of three replicates using Stick dots.

FIG. 11 shows three replicates of a tensile test using stick dots. Since stick dots are made of paper, it is considered a rigid dot. A Rigid dot cannot deform with deformation of the specimen. Instead, while the specimen deforms, the dot sticks to the specimen in one area but slides in another area on the specimen and this is unpredictable. The three replicates curves coincide at yield zone and suggested a good strain measurement in this low strain zone. However, high variation occurs in measured strain at and after the onset of strain hardening. Each test of the three replicates shows a different onset of strain hardening above and below 5 mm/mm strain. This variation in strain increases as measured strain increases to give higher variation in break zone when comparing three replicates strain at the same stress. Stick dots have successfully survived up to the end of the test for all replicates and give a complete stress-strain curve. However, stress dots fail to provide consistent data at strain hardening after onset.

Figure 12:
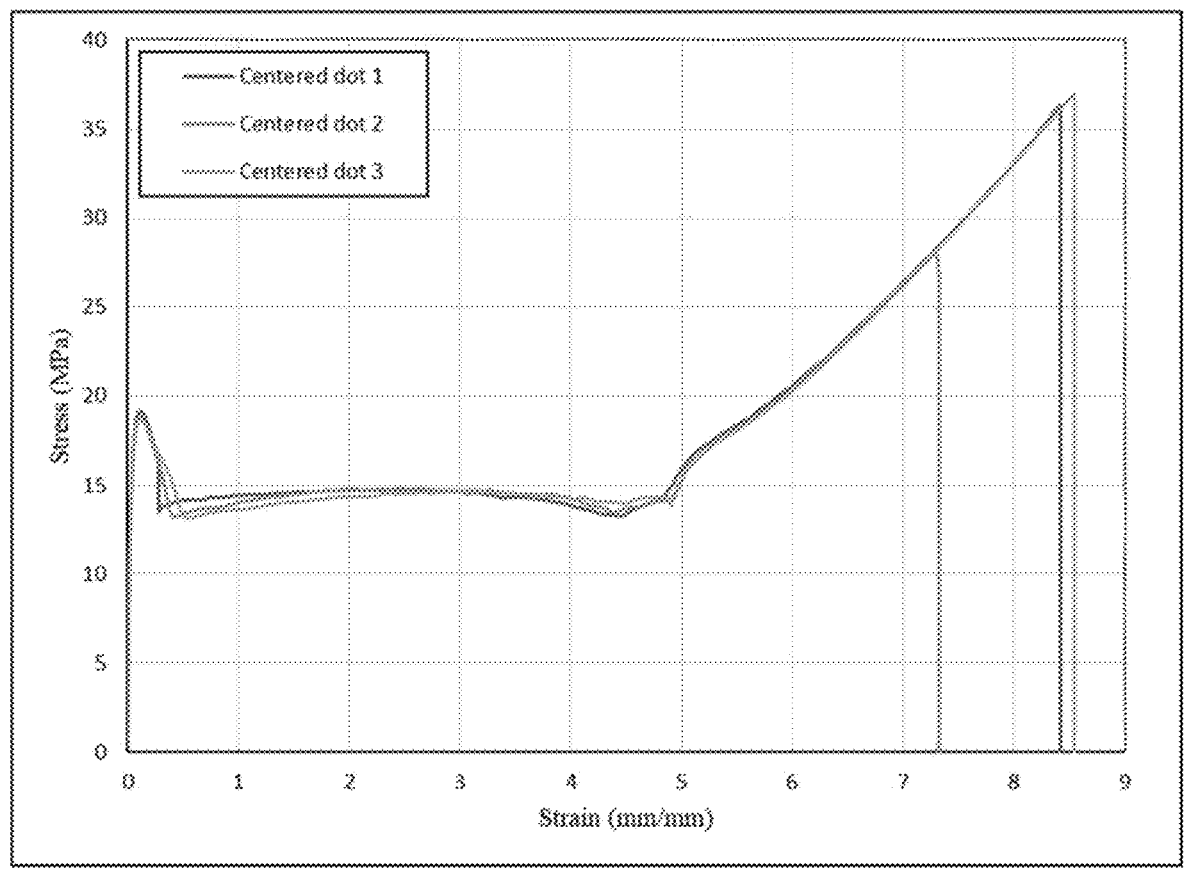
FIG. 12 shows stress-strain curves of three replicates using centered dots of the current disclosure.

FIG. 12 shows three replicates of centered dot tensile tests. This dot is non-deformable, and its location represents a single point on the specimen. The three replicates curves of the tensile test using this dot coincide at the yield zone. They continue to coincide at the onset of strain hardening at about strain of 5 mm/mm and also above onset at strain measured up to the end of each curve. The use of centered dots of the current disclosure give a continuous curve up to break point for all three replicates. It should be noticed that one of the three replicates has significantly lower break stress and break strain suggested a premature break with respect to the specimen.

Figure 13:
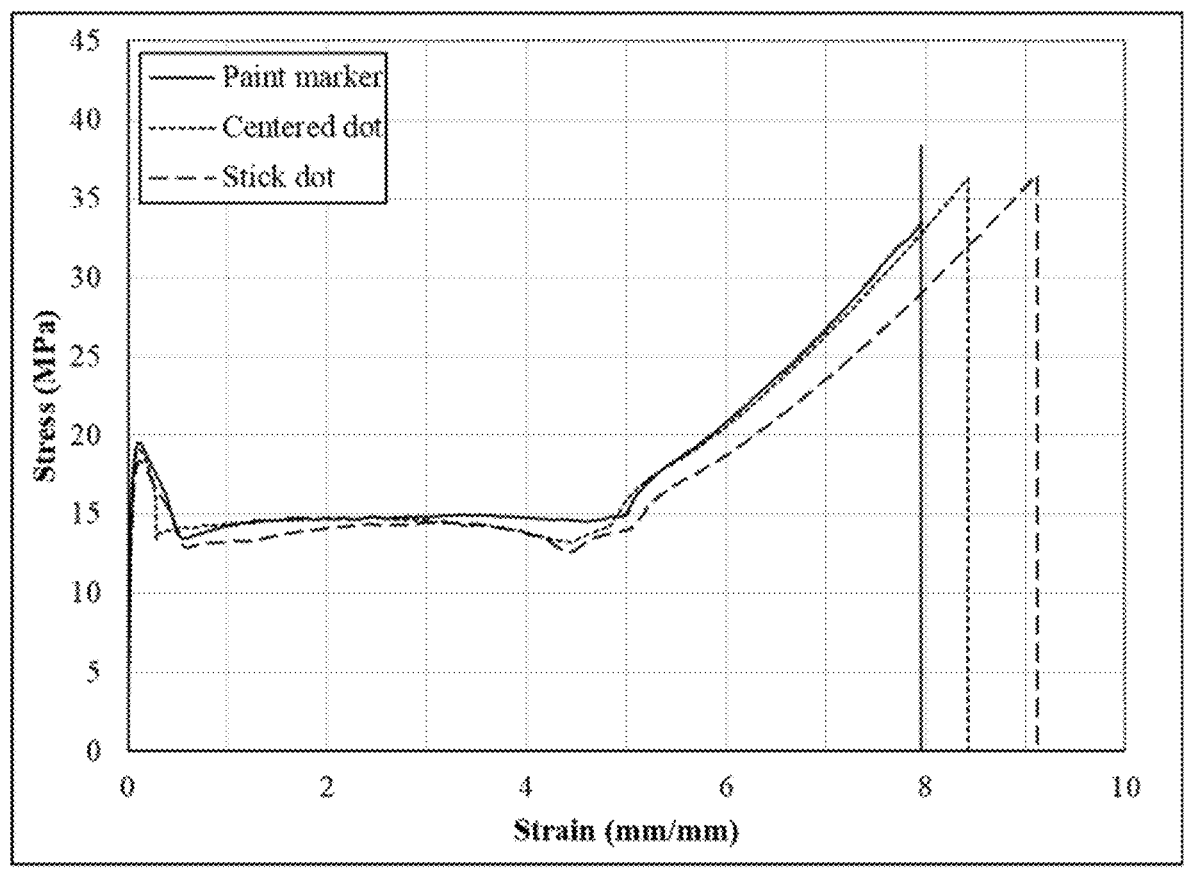
FIG. 13 shows a comparison of stress-strain curves using the three different dot types: paint marker, centered dot, and stick dot.
Figure 14:
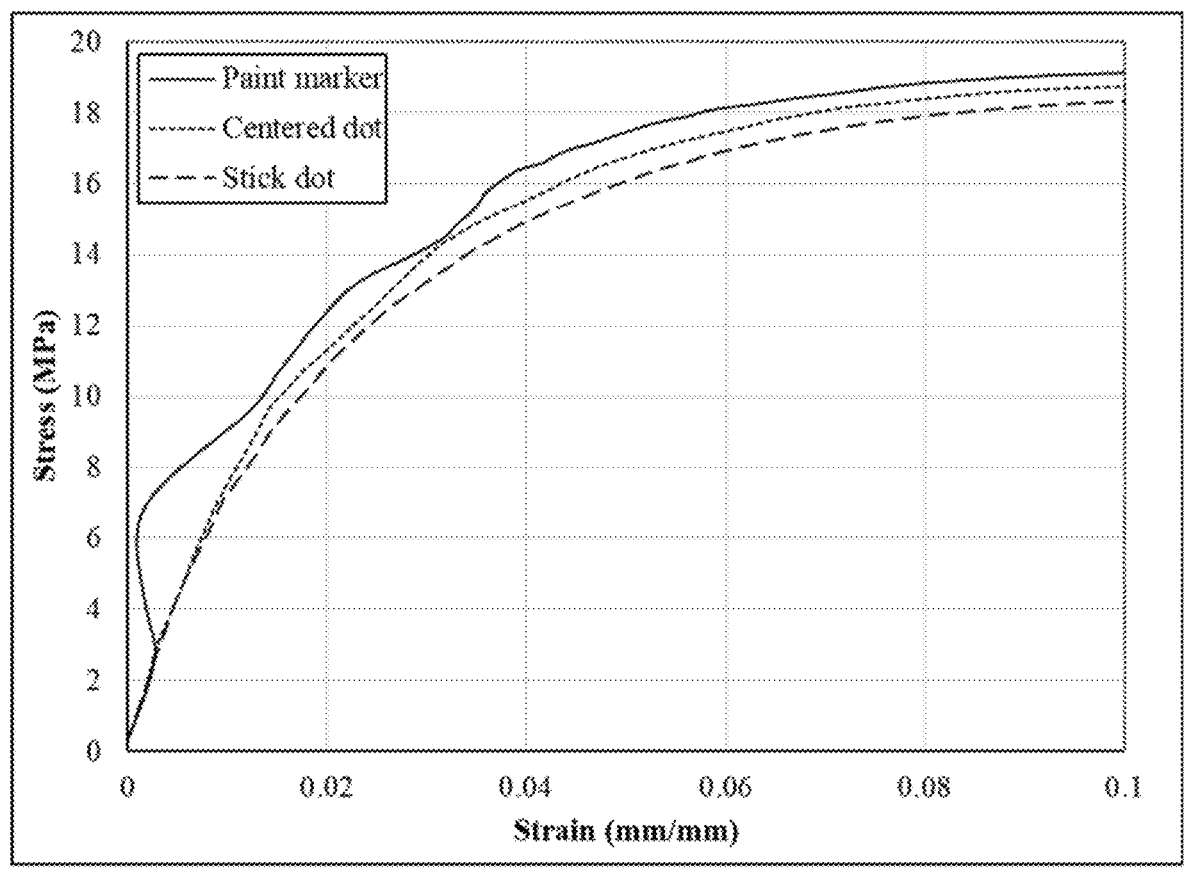
FIG. 14 shows a zone up to yield of stress-strain curves using the three different dot types: paint marker, centered dot, and stick dot.

FIG. 13 compare stress-strain curves of a selected test of each dot type. All three dot types show a yield point in the same zone. FIG. 14 shows the elastic region of each dot type. The paint marker failed to show elastic relation and strain decrease after stress reaches 3 MPa up to 6 MPa. On the other hand, both centered dot and stick dot show a linear response at the elastic region below stress of 8 MPa. However, a different trend in compared strain is noticed at higher strain. The onset of strain hardening of paint marker dot and centered dot are located at a strain of 5 mm/mm while the stick dot onset located above 5 mm/mm (FIG. 13). Curved parts of both paint marker and centered dot are coincided after the onset of strain hardening all the way to the last point of detected strain in the test using a paint marker. The stick dot shows lower stress as strain increases and the curve bias from both other curves using paint marker and centered dot.

Figure 15A:
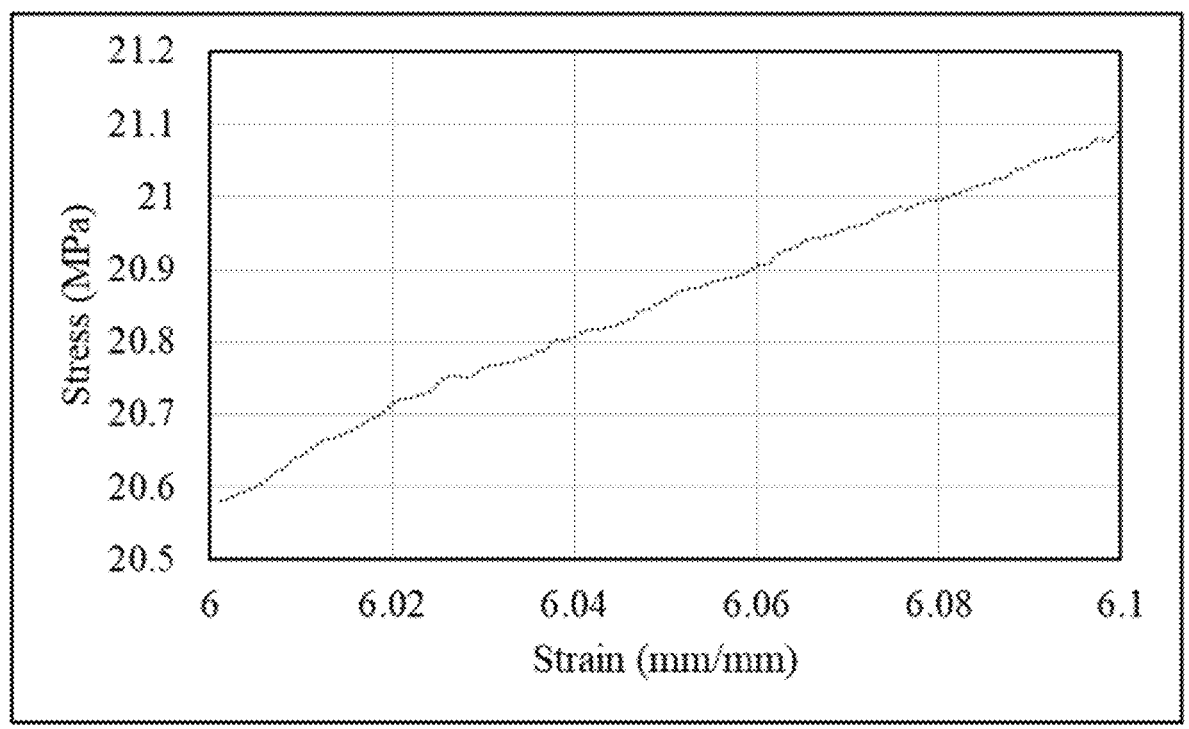
FIGS. 15A, 15B, and 15C show stress-strain curves at a strain of 6-6.1 mm/mm for the three types (centered dot, paint marker, and self-stick dot respectively) of dots being evaluated.
Figure 15B:
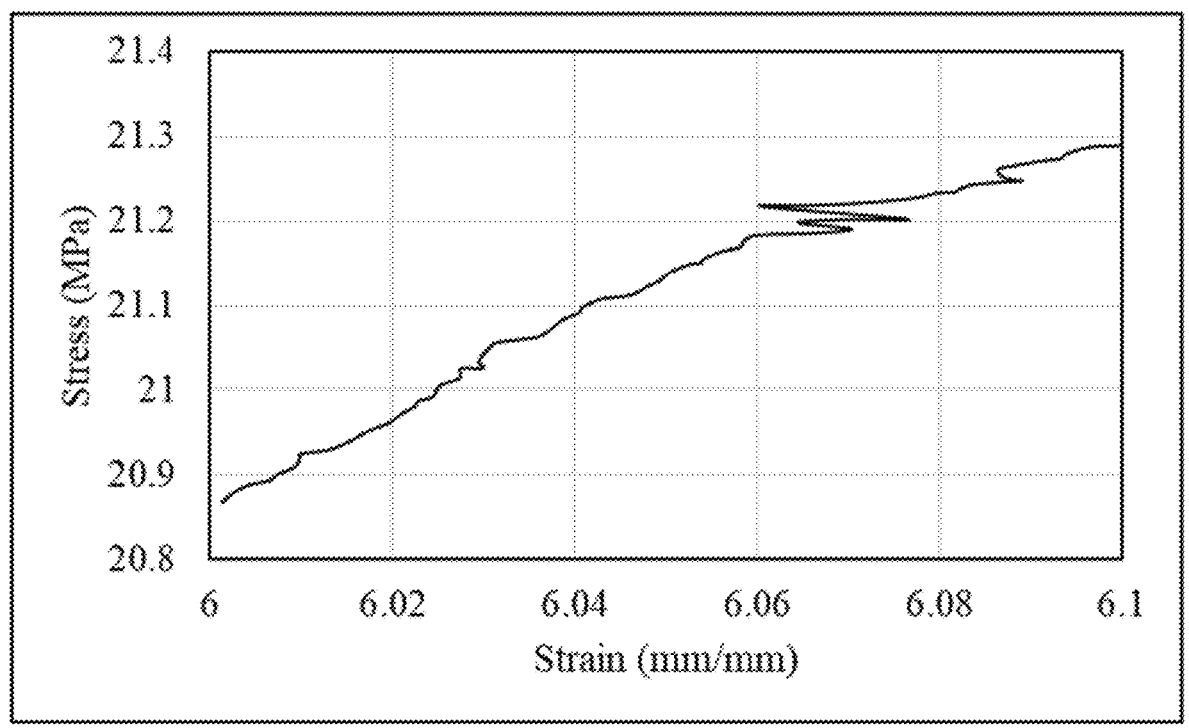
Figure 15C:
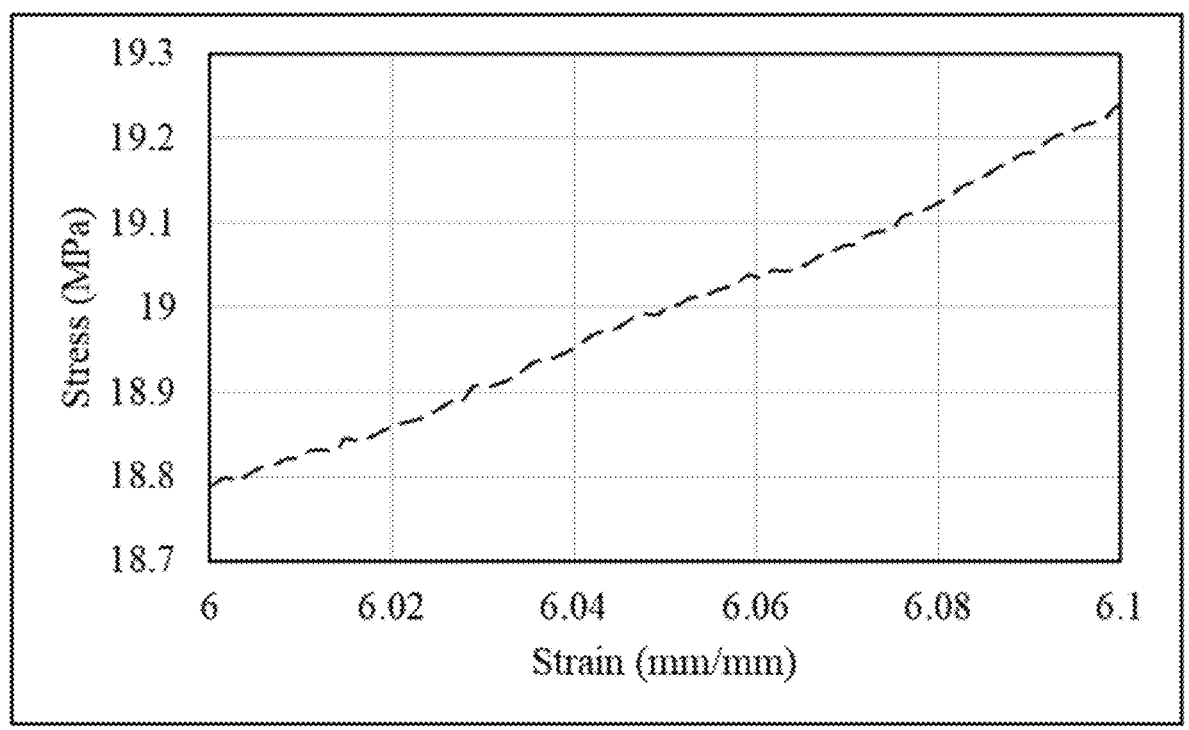
Figure 16:
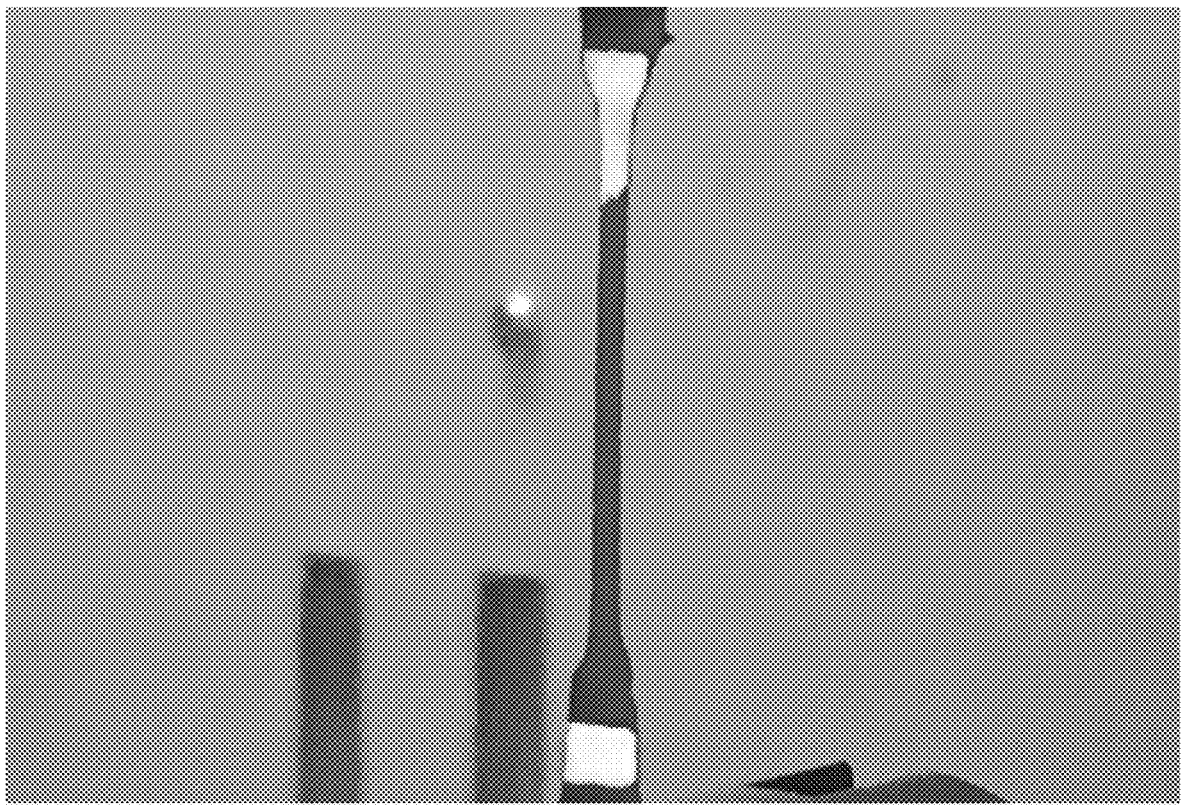
FIG. 16 shows a photograph of a deformed paint marker under tensile extension.
Figure 17:
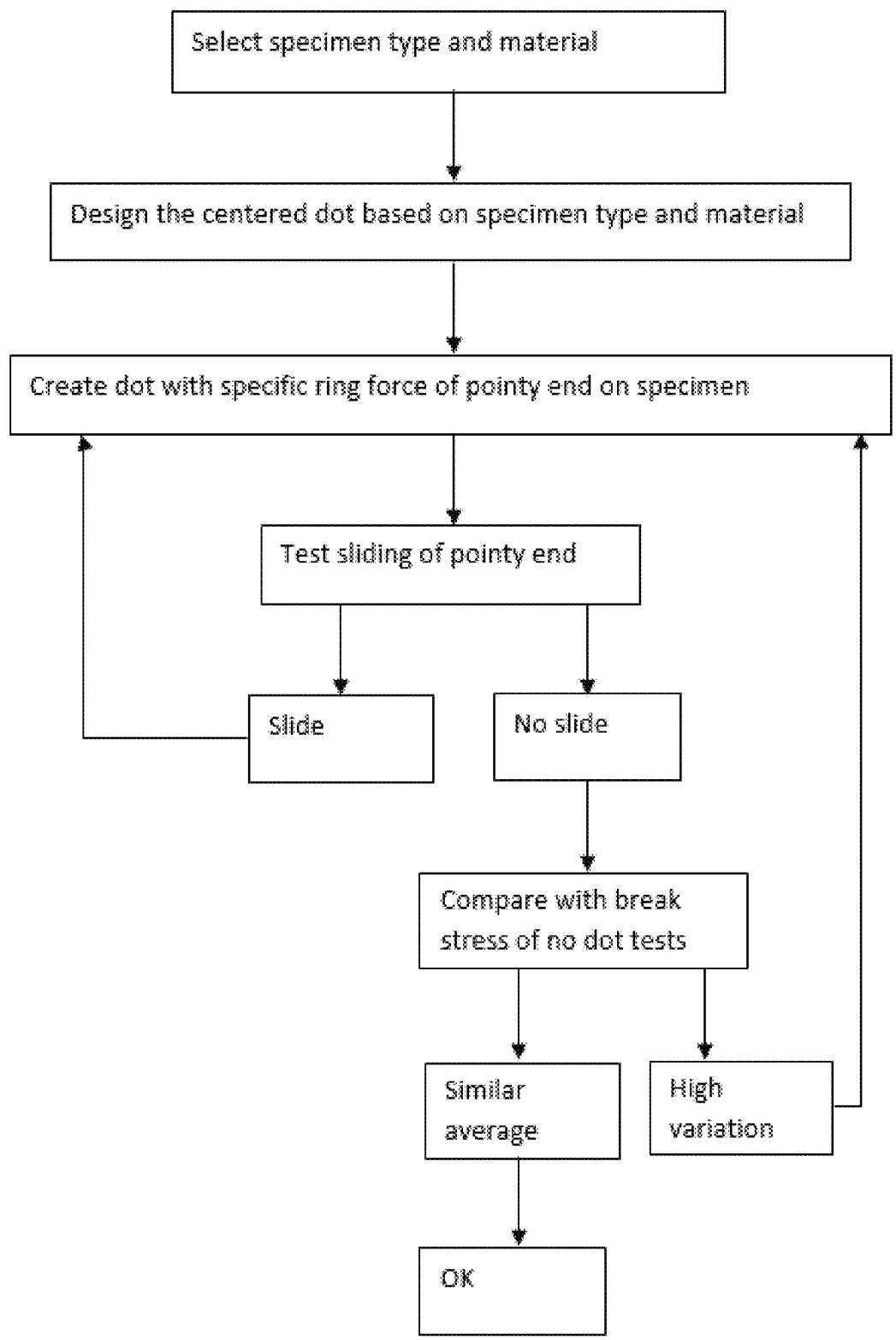
FIG. 17 shows a further embodiment of a design process for a centered dot of the current disclosure.

FIG. 15A-15C show stress-strain curve at a strain of 6-6.1 mm/mm of three dots method (centered dot, paint marker, and self-stick dot respectively). Paint marker shows a high variation in measured strain with a noticed increase and decreases at some data on the curve. FIG. 16 shows a photograph of a deformed paint marker under tensile extension. The deformation of the paint marker on the tensile specimen shows a non-horizontal non-smooth rectangle. Instead, it shows an inclined surface with the jagged, pointy or rocky shape of dot edges. The video extensometer needs the location of the upper and lower edge of the dot to locate the center by averaging these locations. The non-smooth edges result in an increase or decrease in measured strain. However, this may not affect properties measured from the tensile test since it happens only at one segment of data (FIG. 15). Inapposite to paint marker dot, centered dot and stick dot show smooth stress-strain curve with no fluctuation in measured strain at same segment of strain (6-6.1 mm/mm). The smooth curve in the later dot types is attributed to their solid un-deformed appearance, which gives sharp edges and allows the video extensometer to locate the center of dot accurately. FIG. 17 shows a further embodiment of a design process for a centered dot of the current disclosure.

Tensile Properties.

Tensile properties have been calculated at yield point and break point. FIGS. 18A, 18B, 18C, and 18D show Tables 1-4 respectively, which show average and scattering of each tensile property in addition to stress measured at selected strain values after strain hardening onset.

The average and scattering of yield stress were different among dot types. The average yield stress of three replicates ranges from lower values using stick dots followed by centered dots and then paint marker dots. Scattering of yield stress increased with the increase of average yield stress. The relatively higher variation in centered dot and paint marker suggests that these dots may have some effect yield properties. Yield strain values are very consistent at all three type dots with very low scattering (see FIGS. 18A-18D). Average yield strain of paint marker and centered dot show slightly lower values than stick dot with higher variation in the paint marker dot.

Average break stress of the centered dot was very low compared to other dots types with scattering values of three times scattering of other dots. Both stick dot and paint marker dots tests show similar average break stress and scattering. Break strain has not been measured for paint marker dot tests since the strain stops before reaching the break point. The average break strain of stick dots tests was higher than average break strain of centered dot while the later show high scattering. One specimen of centered dot tests break earlier than other two replicates result in increased scattering and decreased average break strain. Break stress decreases by 4 MPa and break strain decreases by 1 mm/mm compared to stick dot results. The early break of this test suggests either intrinsic variation of the tested material or possibly a premature break resulted from the centered dot sharp end that set on the specimen.

Tensile tests of stick dots show high average break strain and high average break stress with a low scattering of both break properties. Stick dots have no damage effect on specimen surfaces, which yield lower scattering in break properties. It is found that most tensile specimens using centered dots break close to dot location. Based on this assumption, the pointy part of centered dot should be redesigned by decreasing gripping force, changing pointy part material, or make a less pointy end to prevent any possible damage. However, the pointy part should be tested whether it stick wells at a location on the specimen after adjustment. In order to check pointy part stability on a specimen, centered dots attached to a specimen and another arm of dot is moved up to see if they move up and down 2-3 mm. If the pointy part is stable during this check and does not move, then stability is good. It is recommended to make the pointy part of the centered dot of a material with lower rigidity compared to tested material. Break stress of centered dots should be compared with three replicate of specimens tested without any dot type to assure a good adjustment.

Paint marker tests show average break stress very close to that of stick dots, suggesting that paint markers do not cause any damage to specimens. The process of design centered dots is shown in FIG. 17. Many considerations have to be taken when designing centered dots such as specimen shape and thickness, tested material properties, cost, and dot production ease. Most important is making sure that centered dots will not cause damage to the specimen surface and will not cause a premature break.

Stresses at Selected Strains

The current disclosure compared the stress-strain curve after the onset of strain hardening. Stresses are calculated at strain values of 6, 6.5, and 7 mm/mm. Stick dots show lower values of stresses compared to other methods, and as the strain increases, more reduction in stress compared to relevant stresses is noticed (see 18A-18D). Also, a scattering of stresses of the tensile test using stick dots is much higher than the other two methods and the variation of stresses increases as strain increases. Paint marker dots and centered dots show similar average stress at selected strains. The variation of stress using paint marker dots is low at a strain of 6.5 mm/mm and high at a strain of 6 and 7 mm/mm. However, centered dots show a consistent low variation at selected strains with scattering about 0.15.

From the above, tensile tests using centered dots with a low scattering of stresses at selected strains after strain hardening onset is preferred among as compared to the other two methods. It is important to keep in mind that centered dots have been produced in this research manually as a prototype product and strain measurement is very sensitive to the location of the center of the dot. The scattering of calculated properties using centered dots may be enhanced and result in lower variation when dot produced in highly accurate devices and repeatable process.

CONCLUSION

The current disclosure provides a new design of dot has been introduced that allows video extensometers to better measure strain. The tensile tests have been performed using geomembrane specimens. Conventional dot types have been evaluated to show the pros and cons of each type. Paint markers results in failure in measuring strain using video extensometers at high strain because of dot fading problems. Stick dots show lower average stresses and high variation compared to paint markers at the same strain, which can be attributed to a high error in measured strain using stick dots. The new dot design (centered dots) overcomes the limitations of both paint marker dots and stick dots with low variation. The accuracy of measured tensile properties using centered dot is expected to increase by producing the dots in a manufactory with more accurate tools and precise machines to locate the center of dots. Design charts can be used to produce a centered dot that works properly with material and specimen dimension.

Figure 19A:
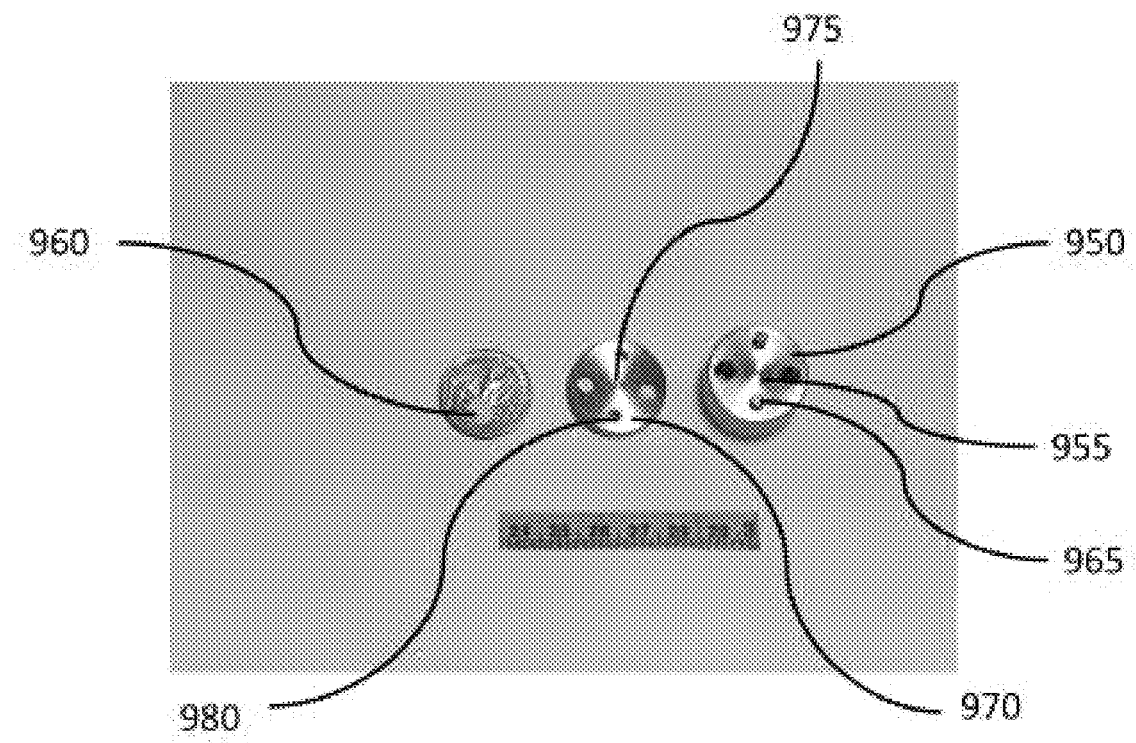
FIGS. 19A and 19B show a center of disk marker comprising a stainless steel die.
Figure 19B:
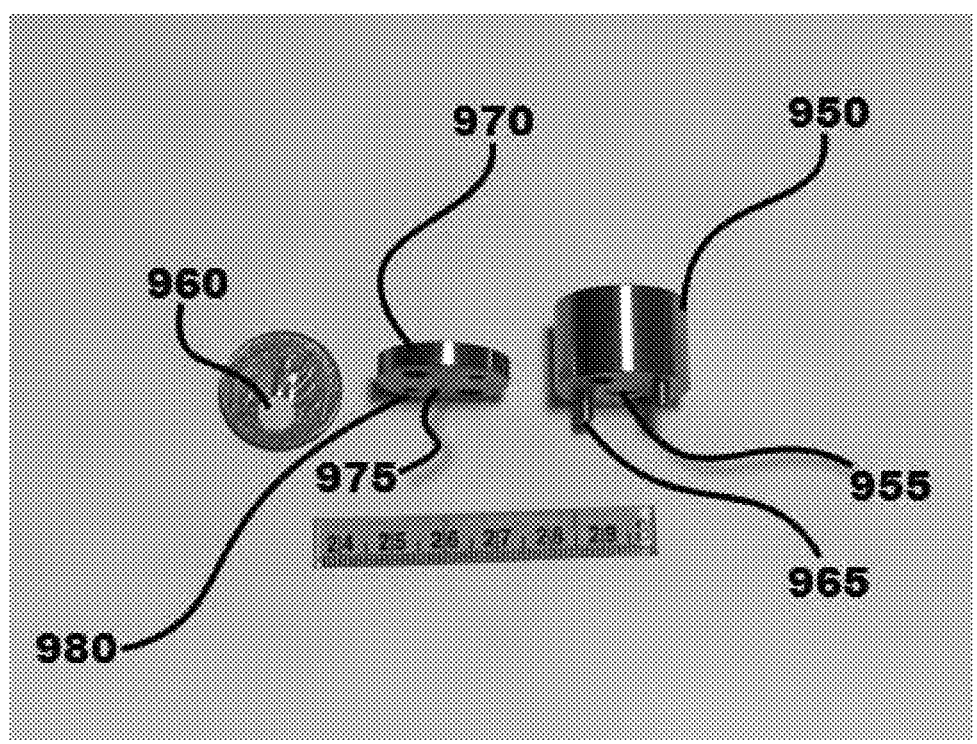
Figure 20A:
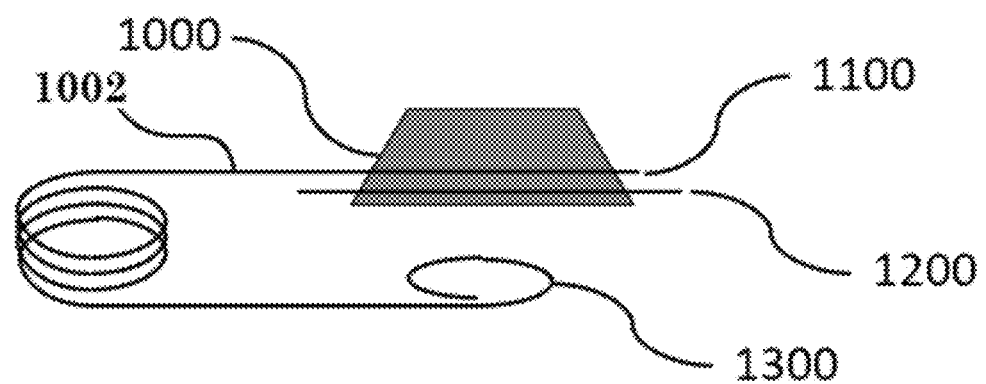
FIG. 20A shows a side view of a blade dot configuration of the current disclosure.
Figure 20B:
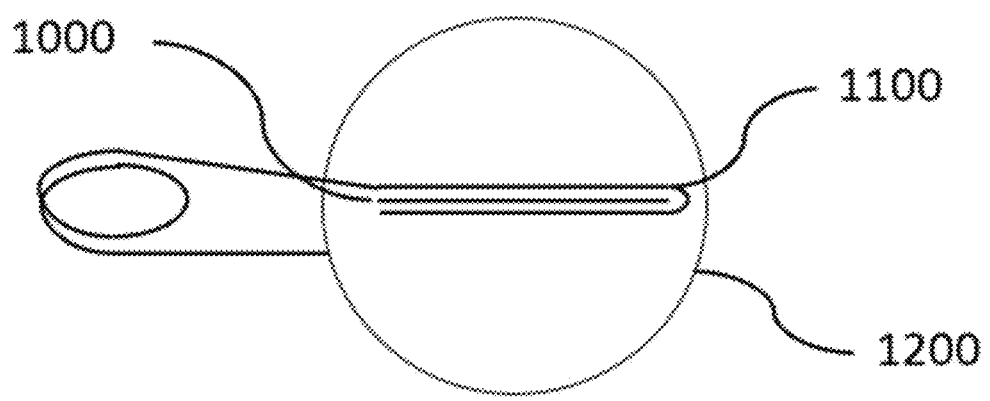
FIG. 20B shows a top view of a blade dot configuration of the current disclosure.
Figure 20C:
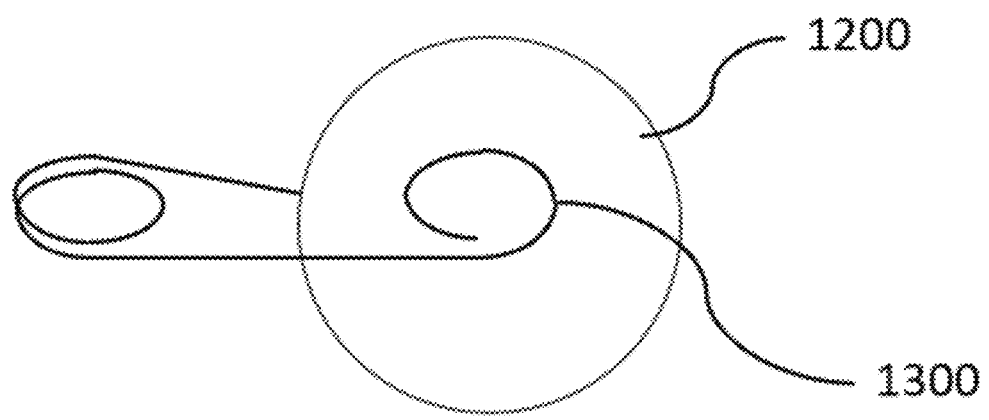
FIG. 20C shows a back view of a blade dot configuration of the current disclosure.

In a further embodiment, a method is provided for locating the center of a disk marker. With respect to FIGS. 19A and 19B, they show a center of disk marker, which may be a stainless steel die manufactured specifically for this purpose. This particularly die was manufactured at the University of South Carolina machine shop. The die comprises a solid cylinder 950, which in one instance may have a 25 mm diameter and be 16 mm in height. The solid cylinder 950 may have a shallow cylinder gap 955 with a 7 mm diameter and approximately a 0.3 mm depth (similar to the disk marker thickness). The cylinder gap 955 hosts the disk marker 960 and maintains it in this location. The solid cylinder 950 has two column guides 965, which may have a diameter of 3 mm and a height of 5 mm. A cylinder cover 970, which may have a diameter of 25 mm and a height of 5 mm, and a protrusion 975 used to mark the center of disk marker 960. The cylinder cover 970 has two holes 980 that allow two column guides 965 to guide the cover 970 and mark the disk marker 960 in its exact center.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A system for measuring strain comprising:
   a tensile specimen marker for use on a tensile specimen, the tensile specimen marker comprising;
      a first arm, a second arm, and a spring connecting the first arm to the second arm;
      wherein the first arm removably attaches to a first side of a tensile specimen;
      wherein the second arm removably attaches to a second side of the tensile specimen;
      wherein the first arm comprises a marker configured to define a position on the tensile specimen;
      wherein at least two tensile specimen markers are attached to the tensile specimen using a ruler to specify a distance between the at least two tensile specimen markers on the tensile specimen; and
      wherein the ruler holds more than the at least two tensile specimen markers to provide for placing more than two markers at more than two locations on the tensile specimen to allow for measuring transvers strain in addition to vertical strain.

2. The system of claim 1, wherein the tensile specimen marker comprises at least one of: a dot, a cone, or a flat sheet.

3. The system of claim 1, wherein the first arm is configured to place the marker on the first side of the tensile specimen.

4. The system of claim 1, wherein the second arm comprises an attachment feature configured to attach to and grip the second side of the tensile specimen.

5. The system of claim 4, wherein the attachment feature comprises a spiral, a pin extending from the second arm, or a flat gripping surface.

6. The system of claim 1, wherein the spring is configured to move the first and second arms from a closed configuration to an open configuration;
   wherein in the closed configuration the first and second arms press against the tensile specimen; and
   wherein in the open configuration, the first and second arms do not engage the tensile specimen.

7. The system of claim 1, wherein the tensile specimen marker is flexible or rigid.

8. The system of claim 1, wherein the first arm, second arm, and the spring comprise a unitary body.

9. The system of claim 1, wherein the first arm, the second arm, and the spring comprise multiple connected parts.

10. The system of claim 1, comprising a tensile specimen.

11. The system of claim 10, wherein the tensile specimen is a wire, a dog-bone, a rectangle or any flat form.

12. The system of claim 1, wherein the at least two tensile markers are configured to be attached, removed, and reused.

13. A method for measuring strain comprising:
   providing a tensile specimen;
   applying at least two of removable markers to the tensile specimen;
   measuring strain between the removable markers;
   wherein the at least two removable markers are attached to the tensile specimen using a ruler to specify a distance between the at least two removable markers on the tensile specimen; and
   wherein the ruler holds more than the at least two removable markers to provide for placing more than two markers at more than two locations on the tensile specimen to allow for measuring transvers strain in addition to vertical strain.

14. The method of claim 13, wherein the step of measuring strain comprises using a video extensometer to detect a location of each of the at least two removable markers.

15. The system of claim 13, wherein the least two of removable markers are configured to attach to specimens comprising different materials.

16. The system of claim 13, wherein a location of the at least two of removable markers is detected by a video extensometer, a laser extensometer, or a DIC system.

* * * * *